(12) United States Patent
Shimakawa et al.

(10) Patent No.: US 11,023,599 B2
(45) Date of Patent: Jun. 1, 2021

(54) INFORMATION PROCESSING DEVICE, INFORMATION PROCESSING METHOD, AND PROGRAM

(71) Applicant: SONY CORPORATION, Tokyo (JP)

(72) Inventors: Masato Shimakawa, Tokyo (JP); Naoyuki Sato, Tokyo (JP); Seiji Suzuki, Kanagawa (JP); Hirotake Ichikawa, Tokyo (JP)

(73) Assignee: SONY CORPORATION, Tokyo (JP)

(*) Notice: Subject to any disclaimer, the term of this patent is extended or adjusted under 35 U.S.C. 154(b) by 119 days.

(21) Appl. No.: 16/344,674

(22) PCT Filed: Oct. 26, 2017

(86) PCT No.: PCT/JP2017/038614
§ 371 (c)(1),
(2) Date: Apr. 24, 2019

(87) PCT Pub. No.: WO2018/092535
PCT Pub. Date: May 24, 2018

(65) Prior Publication Data
US 2019/0303594 A1  Oct. 3, 2019

(30) Foreign Application Priority Data

Nov. 21, 2016 (JP) .............................. JP2016-226212

(51) Int. Cl.
*G06F 21/62* (2013.01)
*G06T 19/00* (2011.01)
(Continued)

(52) U.S. Cl.
CPC .............. *G06F 21/62* (2013.01); *G06F 13/00* (2013.01); *G06T 1/00* (2013.01); *G06T 19/00* (2013.01);
(Continued)

(58) Field of Classification Search
CPC combination set(s) only.
See application file for complete search history.

(56) References Cited

U.S. PATENT DOCUMENTS 10,187,435 B2 * 1/2019 Yin .......................... H04L 65/80
10,404,938 B1 * 9/2019 De Benoist ............ H04N 7/147
(Continued)

FOREIGN PATENT DOCUMENTS

| JP | 2002-305758 A | 10/2002 |
| JP | 2005-004487 A | 1/2005 |
| JP | 2005-182331 A | 7/2005 |

*Primary Examiner* — Piotr Poltorak
(74) *Attorney, Agent, or Firm* — Paratus Law Group, PLLC

(57) ABSTRACT

There is provided an information processing device, an information processing method, and a program which are capable of appropriately restricting the use of content in a situation in which a certain user ends the use of the content. The information processing device includes: an acquiring unit configured to acquire information indicating an end of use of content of a free viewpoint by a first user, which is provided on the basis of sensing of a real space and shared by at least the first user and a second user; and a use restricting unit configured to set restrictions related to the use of the content of the free viewpoint on the basis of the information indicating the end of the use and first setting information.

19 Claims, 26 Drawing Sheets

(51) Int. Cl.
*H04L 29/06* (2006.01)
*G06T 1/00* (2006.01)
*G06F 13/00* (2006.01)

(52) U.S. Cl.
CPC .......... *H04L 63/10* (2013.01); *H04L 65/1089* (2013.01); *H04L 65/4023* (2013.01); *H04L 67/38* (2013.01); *G06T 2219/024* (2013.01)

(56) References Cited

U.S. PATENT DOCUMENTS

| | | | |
|---|---|---|---|
| 10,410,562 B2* | 9/2019 | Osawa | H04N 13/156 |
| 10,733,371 B1* | 8/2020 | Baloga | G06F 3/04815 |
| 10,831,805 B1* | 11/2020 | Buckingham | G06F 21/31 |
| 2002/0023133 A1* | 2/2002 | Kato | H04L 12/1822 709/205 |
| 2003/0196094 A1* | 10/2003 | Hillis | G06F 21/64 713/179 |
| 2004/0117446 A1* | 6/2004 | Swanson | H04L 29/06027 709/205 |
| 2004/0167881 A1* | 8/2004 | Masuda | H04L 67/18 |
| 2004/0204020 A1* | 10/2004 | Kuramitsu | H04N 7/17318 455/550.1 |
| 2004/0246332 A1* | 12/2004 | Crouch | H04L 63/104 348/14.08 |
| 2005/0154574 A1* | 7/2005 | Takemura | H04L 12/2818 703/22 |
| 2006/0092863 A1* | 5/2006 | Schmidt | H04M 3/56 370/260 |
| 2006/0153352 A1* | 7/2006 | Schmidt | H04L 65/1016 379/202.01 |
| 2006/0182249 A1* | 8/2006 | Archambault | H04L 12/1818 379/202.01 |
| 2006/0242632 A1* | 10/2006 | Orsolini | G06Q 10/10 717/140 |
| 2007/0027764 A1* | 2/2007 | Masuo | G06Q 30/0273 705/14.69 |
| 2007/0053514 A1* | 3/2007 | Imai | H04N 21/4331 380/204 |
| 2008/0189366 A1* | 8/2008 | Cox | H04L 67/306 709/204 |
| 2011/0137438 A1* | 6/2011 | Zhang | H04N 7/15 700/94 |
| 2011/0154391 A1* | 6/2011 | Velazquez | H04N 21/8106 725/33 |
| 2013/0097248 A1* | 4/2013 | Chakra | G06Q 10/107 709/206 |
| 2013/0225305 A1* | 8/2013 | Yang | A63F 13/285 473/152 |
| 2014/0012614 A1* | 1/2014 | Beresford-Wood | G06Q 40/12 705/7.15 |
| 2014/0123028 A1* | 5/2014 | Kamity | H04N 21/4788 715/753 |
| 2014/0189063 A1* | 7/2014 | Carriero | H04L 67/1095 709/219 |
| 2015/0160721 A1* | 6/2015 | Ishihara | G06F 21/50 345/156 |
| 2015/0180931 A1* | 6/2015 | Marr | H04L 67/06 713/165 |
| 2015/0188870 A1* | 7/2015 | Sharp | H04L 51/22 715/752 |
| 2015/0189008 A1* | 7/2015 | Karkkainen | H04N 21/2343 709/204 |
| 2016/0234264 A1* | 8/2016 | Coffman | H04L 65/4053 |
| 2016/0299666 A1* | 10/2016 | Sakamoto | G06F 3/04845 |
| 2017/0139941 A1* | 5/2017 | Bartlett | H04L 67/06 |
| 2017/0161338 A1* | 6/2017 | Kurata | G06F 17/00 |
| 2018/0189555 A1* | 7/2018 | Satake | G06F 3/011 |
| 2019/0171281 A1* | 6/2019 | Hayashida | A63F 13/87 |

* cited by examiner

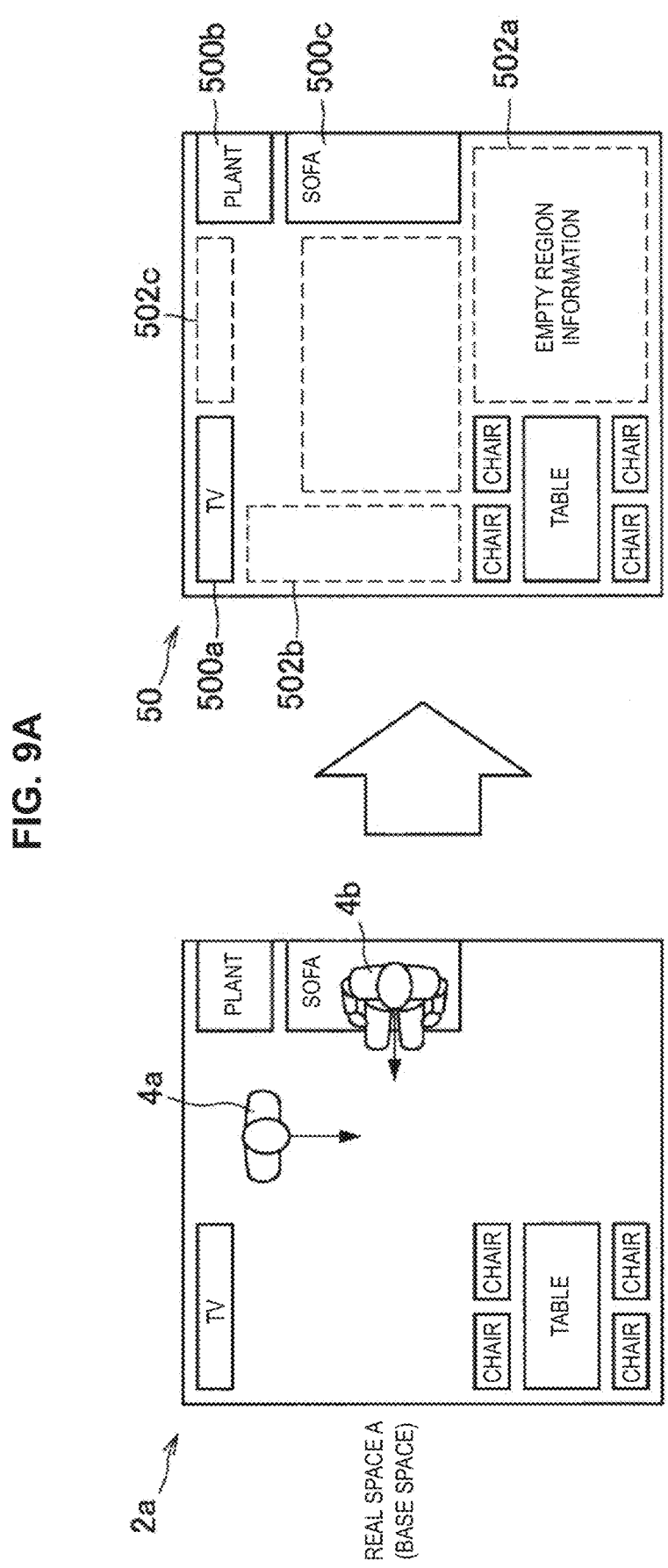

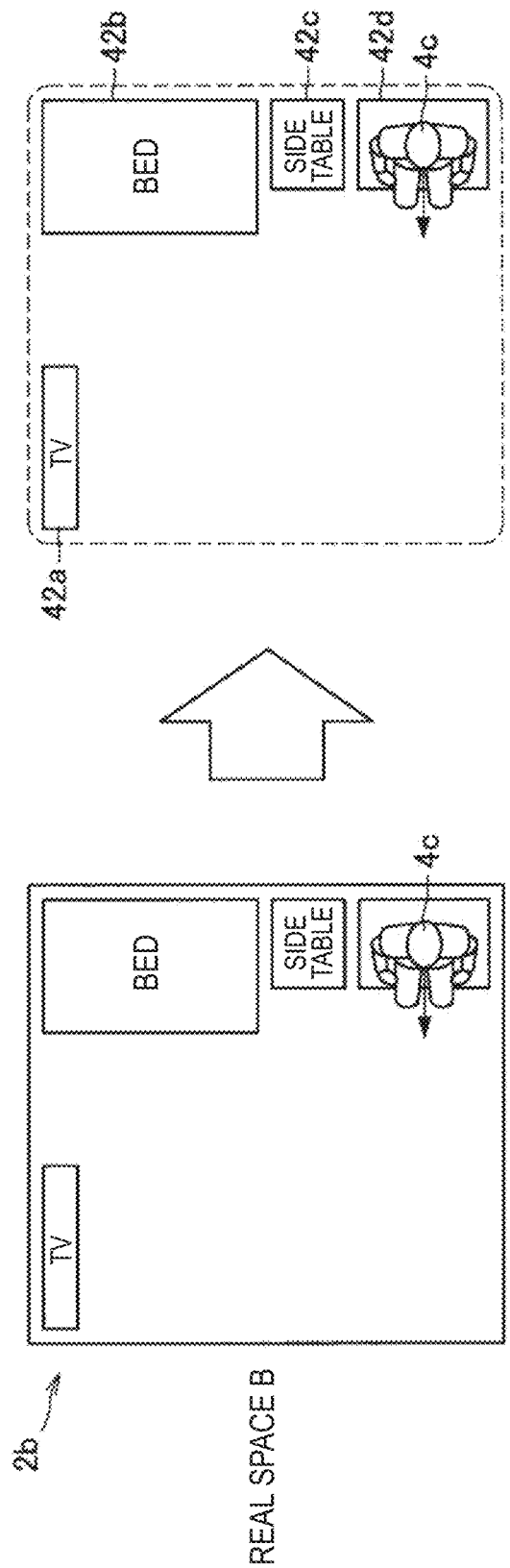

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2017/038614 (filed on Oct. 26, 2017) under 35 U.S.C. § 371, which claims priority to Japanese Patent Application No. 2016-226212 (filed on Nov. 21, 2016), which are all hereby incorporated by reference in their entirety.

TECHNICAL FIELD

The present disclosure relates to an information processing device, an information processing method, and a program.

BACKGROUND ART

In the past, various techniques for generating content on the basis of a result of sensing a real space, for example, for the purpose of generating highly realistic content have been proposed.

For example, Patent Literature 1 discloses a technique for generating a free viewpoint video on the basis of images captured by a plurality of cameras.

CITATION LIST

Patent Literature

Patent Literature 1: JP 2005-4487A

DISCLOSURE OF INVENTION

Technical Problem

Incidentally, it is also desirable for content of a free viewpoint to be able to be shared by a plurality of users. If the technique disclosed in Patent Literature 1 is assumed to be applied to such a situation, in the technique disclosed in Patent Literature 1, in a case in which a certain user ends the use of the content, a process when other users use the content thereafter is not considered.

In this regard, the present disclosure proposes an information processing device, an information processing method, and a program which are capable of appropriately restricting the use of content in a situation in which a certain user ends the use of the content.

Solution to Problem

According to the present disclosure, there is provided an information processing device, including: an acquiring unit configured to acquire information indicating an end of use of content of a free viewpoint by a first user, which is provided on the basis of sensing of a real space and shared by at least the first user and a second user; and a use restricting unit configured to set a restriction related to the use of the content of the free viewpoint on the basis of the information indicating the end of the use and first setting information.

Moreover, according to the present disclosure, there is provided an information processing method, including: acquiring information indicating an end of the use of content of a free viewpoint by a first user, which is provided on the basis of sensing of a real space and shared by at least the first user and a second user; and setting, by a processor, a restriction related to the use of the content of the free viewpoint on the basis of the information indicating the end of the use and first setting information.

Moreover, according to the present disclosure, there is provided a program causing a computer to function as: an acquiring unit configured to acquire information indicating an end of use of content of a free viewpoint by a first user, which is provided on the basis of sensing of a real space and shared by at least the first user and a second user; and a use restricting unit configured to set a restriction related to the use of the content of the free viewpoint on the basis of the information indicating the end of the use and first setting information.

Advantageous Effects of Invention

As described above, according to the present disclosure, it is possible to appropriately restrict the use of content in a situation in which a certain user ends the use of the content. Further, the effects described herein are not necessarily limiting, and any effect described in the present disclosure may be included.

BRIEF DESCRIPTION OF DRAWINGS

FIG. 9A is an explanatory diagram illustrating a part of a generation example of a shared space according to the embodiment.

FIG. 9B is an explanatory diagram illustrating a part of a generation example of a shared space according to the embodiment.

MODE(S) FOR CARRYING OUT THE INVENTION

Figure 1:
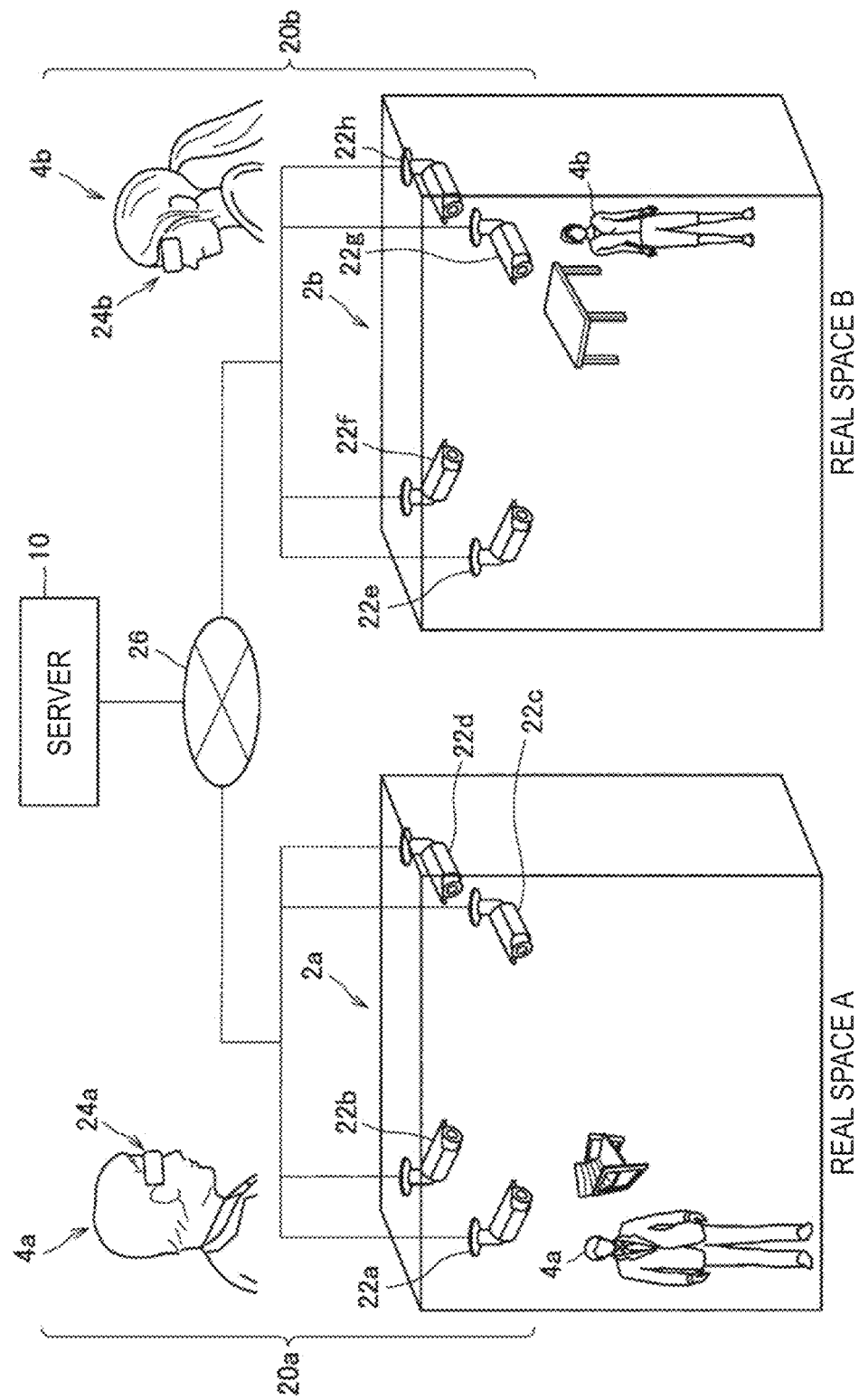
FIG. 1 is an explanatory diagram illustrating a configuration example of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, a plurality of constituent elements having substantially the same functional configuration are also distinguished by attaching different letters after the same reference numerals. For example, a plurality of components having substantially the same functional configuration are distinguished like an input unit 22a and an input unit 22b if necessary. Here, in a case in which it is not necessary to particularly distinguish each of a plurality of constituent elements having substantially the same functional configuration, only the same reference numerals are attached. For example, in a case in which it is not necessary to particularly distinguish the input unit 22a and the input unit 22b from each other, they are simply referred to as an input unit 22.

Further, a "mode for carrying out the invention" will be described in accordance with the order of items listed below.
1. Configuration of Information Processing System
2. Detailed Description of Embodiments
3. Hardware Configuration
4. Modified Examples

1. Configuration of Information Processing System

1-1. Overview

First, a configuration of an information processing system according to an embodiment of the present disclosure will be described with reference to FIG. 1. As illustrated in FIG. 1, the information processing system according to the present embodiment includes a server 10, a plurality of clients 20, and a communication network 26. Further, each client 20 includes an input unit 22 and an output unit 24.

As illustrated in FIG. 1, in the present embodiment, it is assumed that a plurality of real spaces 2 are defined in advance, and a client 20 is arranged in each of the plurality of real spaces 2. Here, the real spaces 2 may be rooms (for example, a living room or a conference room) or corridors in a facility such as a house, a shop, an office building, a station, or a leisure facility. Further, although FIG. 1 illustrates an example in which two real spaces 2 are installed, the present disclosure is not limited to this example, and three or more real spaces may be installed. Further, basically, it is assumed that there are one or more users in each real space 2, but the present disclosure is not limited to this example, and there may be a real space in which there is no user.

Further, the server 10 and each client 20 are connected via the communication network 26 and can perform transmission and reception of data.

Incidentally, in a situation in which the users located in the different real spaces 2 communicate, it is possible to realize smoother communication by showing real things to the other user while talking. For example, in a situation in which the user describes a product, if the user explains it while showing the product itself or a model of the product to the other user, it is easy for the other user to understand it.

Further, depending on a communication situation, it may be desirable to show the other user an object located away from the user (such as an object that becomes a topic between the users performing communication) in addition to an object located near the user. In this regard, the server 10 according to the present embodiment venerates content of a free viewpoint by synthesizing 3D data of substantially all of each real space 2 in which each user performing communication is located. Further, the respective users can freely communicate while having an experience as if they were located within the same space by viewing the content of the free viewpoint at the same time.

(Content of Free Viewpoint)

Here, the content of the free viewpoint may be data for presenting a video (for example, a video of a real space 2 or the like) from a free viewpoint position which is provided on the basis of data obtained by sensing the real space 2 from a plurality of viewpoints (input unit 22) arranged in the real space 2. For example, a three-dimensional virtual space can be constructed, for example, by integrating data obtained by sensing the real space simultaneously from a plurality of viewpoints. In this case, the content of the free viewpoint may be data presenting a video from a free viewpoint in the three-dimensional virtual space. For example, the content of the free viewpoint may be data presenting a video of a virtual space from a viewpoint when the viewpoint is virtually freely moved in the three-dimensional virtual space.

For example, in a case in which the content of the free viewpoint is displayed on a head mounted display (HMD) worn by the user, and the user performs a manipulation (for example, a manipulation, a voice command, or the like to a predetermined input device) for moving the viewpoint, the video from the moved viewpoint based on the manipulation can be displayed on the HMD. As described above, the user may be able to view the content of a free viewpoint by freely moving the viewpoint.

Further, the content of the free viewpoint may include three-dimensional information and color information indicating each object in the real space 2 of a sensing target. For example, the content of the free viewpoint includes three-dimensional information indicating a position of each point of a virtual object corresponding to each object in the three-dimensional virtual space and color information of each point. Further, the content of the free viewpoint may further include audio information such as sounds collected by the input unit 22.

1-2. Input Unit 22

Content of the client 20 and the server 10 will be described below in further detail. As illustrated in FIG. 1, the input unit 22 may include a plurality of cameras (for example, a plurality of depth cameras and a plurality of RGB cameras) installed in the real space 2. The input unit 22 acquires 3D data of each object in the real space, for example, by sensing the real space in which the input unit 22 is arranged. Then, the input unit 22 transmits frame data including the acquired 3D data to the server 10.

Figure 2:
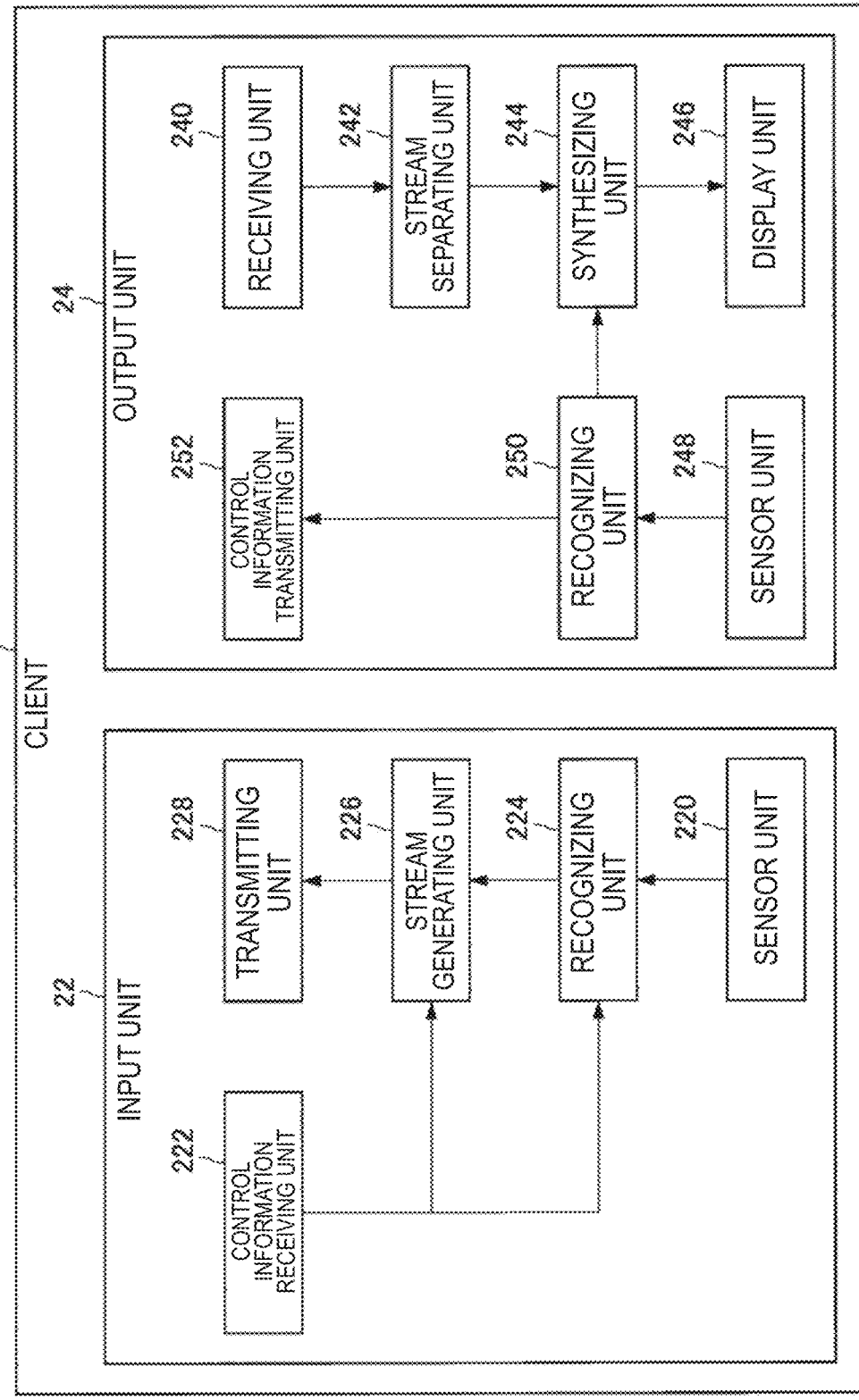
FIG. 2 is a functional block diagram illustrating a configuration example of a client 20 according to the embodiment.

FIG. 2 is a functional block diagram illustrating a configuration example of the client 20 (the input unit 22 and the output unit 24). As illustrated in FIG. 2, the input unit 22 has a sensor unit 220, a control information receiving unit 222, a recognizing unit 224, a stream generating unit 226, and a transmitting unit 228.

{1-2-1. Sensor Unit 220}

The sensor unit 220 may include various types of sensors such as a three-dimensional sensor (for example, a depth sensor, a stereo camera, or the like) and a two-dimensional sensor (for example, an image sensor, an infrared sensor, or the like). The sensor unit 220 detects various types of information such as 3D data in the real space in which the sensor unit 220 is placed by performing a reception or reading process or the like. For example, the sensor unit 220 may include a plurality of depth cameras and a plurality of RGB cameras. Further, as each of a plurality of depth cameras detects distance information to an object located in front of the depth camera, the sensor unit 220 can acquire 3D data of substantially all of the real space. Further, each of the plurality of RGB cameras can acquire a 2D image by imaging. Here, a format of 3D data may be any format such as a point cloud or a 3D mesh (polygon), for example. Further, the plurality of cameras included in the sensor unit 220 are connected to each other, and frame synchronization can be performed.

(1-2-1-1 Segmentation Process)

For example, the sensor unit 220 first generates point cloud data in units of frames, and performs an object segmentation process on the basis of the generated point cloud data. Then, the sensor unit 220 calculates information of the region that each of the segmented objects occupies in the real space 2 in which the sensor unit 220 is arranged. Further, the sensor unit 220 assigns an object ID to each object. Here, the object IDs are IDs uniquely identifying each object.

Figure 3:
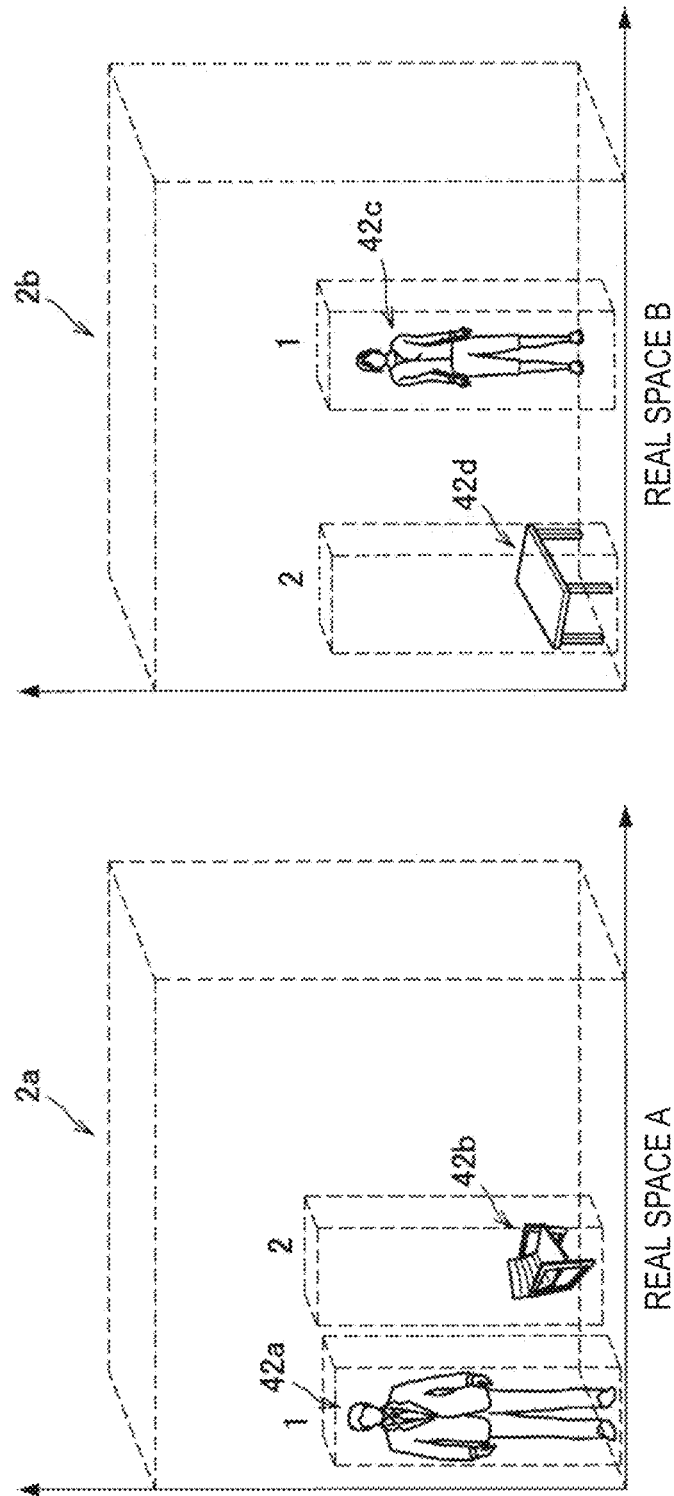
FIG. 3 is an explanatory diagram illustrating an example of segmentation of an object located in a real space 2.

Here, the above content will be described in further detail with reference to FIG. 3. As illustrated in FIG. 3, for example, a sensor unit 220a in a real space 2a segments an object 42a and an object 42b, sets "1" as an object ID of the object 42a, and sets "2" as an object ID of the object 42b. Similarly, as illustrated in FIG. 3, a sensor unit 220b in a real space 2b segments an object 42c and an object 42d, sets "1" as an object ID of the object 42c, and sets "2" as an object ID of the object 42d.

(1-2-1-2. Modeling Process)

Further, the sensor unit 220 can perform a modeling process on each of the segmented objects and generate a 3D mesh.

Further, the sensor unit 220 further generates 2D image correlation information indicating a correspondence relation between each object and a 2D image captured by the sensor unit 220. Here, the 2D image correlation information is information indicating a position in the captured 2D image corresponding to each object.

Further, the sensor unit 220 can perform a tracking process of each object on the basis of a feature quantity of each segmented object or the like. Further, the sensor unit 220 does not change the object ID assigned to the object for the object determined to be identical between consecutive frames.

Further, the sensor unit 220 may further include one or more microphones. Further, the sensor unit 220 can collect sound in the real space.

(1-2-1-3. Output)

Further, the sensor unit 220 outputs the frame data including the captured 2D image, the acquired 3D data of each object, and the 2D image correlation information in units of frames. Further, the frame data may further include collected audio data.

Further, the sensor unit 220 may be constituted by a single device (for example, a camera) or may be constituted by a plurality of devices. Further, in a case in which it is constituted by a plurality of devices, 3D data or the like acquired by the plurality of devices can be synthesized with a high degree of accuracy by calibration, a frame synchronization process, or the like.

{1-2-2. Control Information Receiving Unit 222}

The control information receiving unit 222 may include a communication device such as a network card. The control information receiving unit 222 receives first control information from the server 10. Further, the control information receiving unit 222 transmits the received first control information to the recognizing unit 224 and the stream generating unit 226. Here, the first control information may include, for example, information of an instruction related to a recognition process by the recognizing unit 224 to be described later or information of an instruction related to stream generation by a stream generating unit 226 to be described later.

{1-2-3. Recognizing Unit 224}

(1-2-3-1. Recognition)

The recognizing unit 224 may include one or more process circuits (such as a central processing unit (CPU)). The recognizing unit 224 performs various types of recognition processes on the basis of the frame data transmitted from the sensor unit 220. For example, the recognizing unit 224 may perform the recognition process on the basis of the 3D data included in the frame data or may perform the recognition process on the basis of the 2D image included in the frame data.

For example, the recognizing unit 224 recognizes the type of the object on the basis of the frame data. Further, the recognizing unit 224 further performs face recognition, bone recognition, and finger recognition for an object determined as a person. Further, the recognizing unit 224 can recognize a manipulation performed by the user for starting the use of the content of the free viewpoint (generated by the server 10) or a manipulation performed by the user for ending the use of the content of the free viewpoint. Further, specific content of such manipulations will be described later.

Further, in a case in which the first control information is transmitted from the control information receiving unit 222, the recognizing unit 224 can also perform the recognition process in accordance with the first control information.

(1-2-3-2. Output)

Further, the recognizing unit 224 adds the result of the recognition process to the transmitted frame data, and transmits the resulting frame data to the stream generating unit 226. For example, the recognizing unit 224 first generates meta information, bone recognition information, and finger recognition information on the basis of, for example, the result of the recognition process for an object determined as a person. Then, the recognizing unit 224 adds this information to the transmitted frame data. Here, the meta information is information indicating an attribute or the like of each recognized object. For example, for each object, the meta information may include the object ID of the object, the region information indicating a location of the object, a type of the object, the real space, information of whether or not the object is in contact with or close to another object, an ID of another object located in the vicinity of the object, and/or the like.

{1-2-4. Stream Generating Unit 226}

The stream generating unit 226 may include one or more process circuits (such as a CPU). The stream generating unit 226 generates a stream on the basis of the frame data transmitted from the recognizing unit 224. Then, the stream generating unit 226 transmits the generated stream to the transmitting unit 228. For example, the stream generating unit 226 may first generate one stream by multiplexing various types of information transmitted from the recognizing unit 224, and transmit the one stream to the transmitting unit 228. Alternatively, the stream generating unit 226 may generate separate streams from various types of information transmitted from the recognizing unit 224 and transmit each generated stream to the transmitting unit 228.

Further, in a case in which the first control information is transmitted from the control information receiving unit 222, the stream generating unit 226 may extract some information designated by the first control information from the information transmitted from the recognizing unit 224 and generate a stream including only the extracted information. Further, the stream generating unit 226 may transmit the stream to the transmitting unit 228.

{1-2-5. Transmitting Unit 228}

The transmitting unit 228 may include a communication device such as a network card. The transmitting unit 228 transmits the stream transmitted from the stream generating unit 226 to the server 10.

1-3. Server 10

The server 10 is an example of an information processing device in the present disclosure. On the basis of the stream received from the input unit 22 of each real space 2, the server 10 generates a (virtual) shared space for communication between the users located in the different real spaces 2. For example, the server 10 generates the shared space by combining the streams received from the input units 22 (the transmitting units 228) in the respective real spaces 2.

Figure 4:
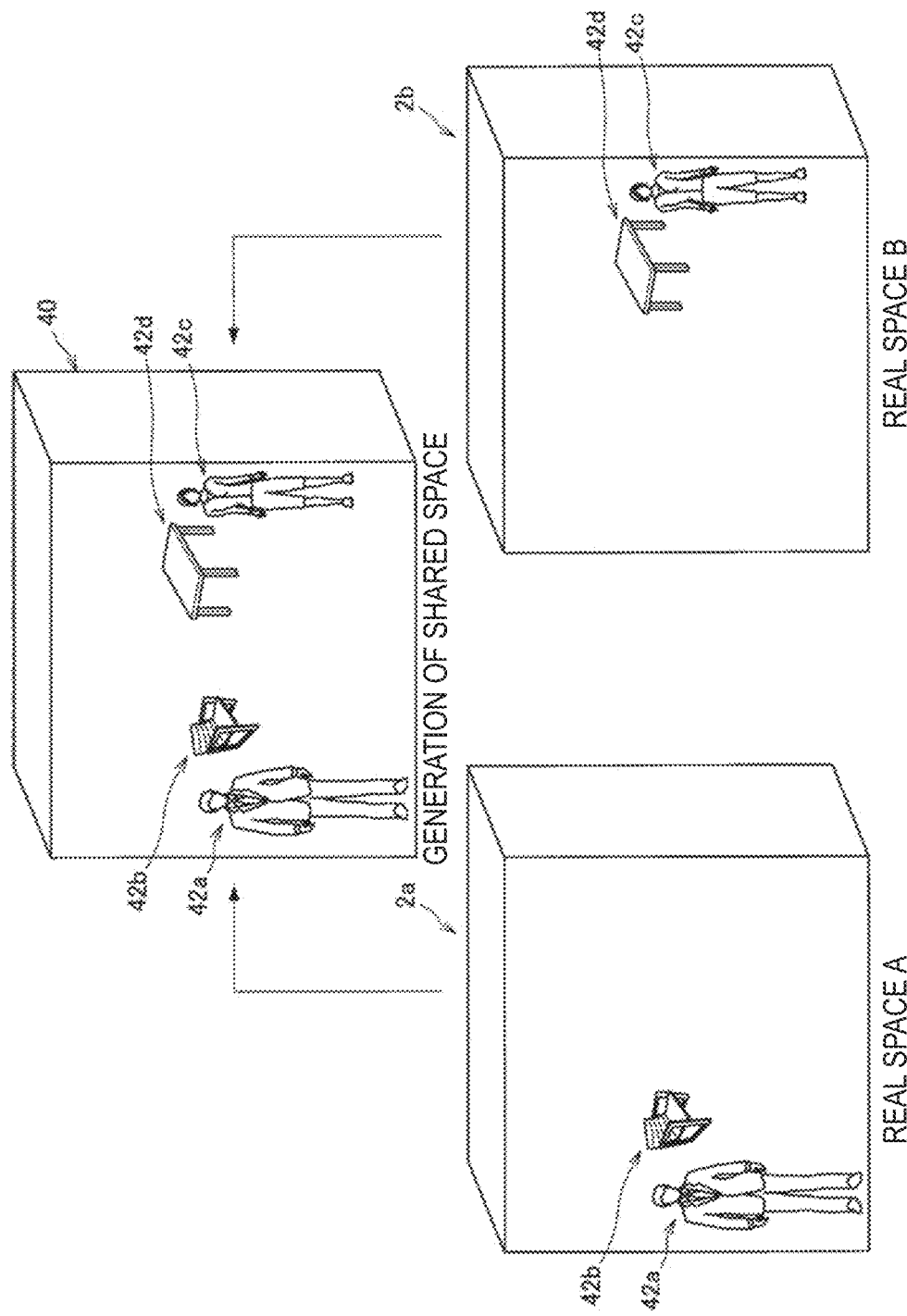
FIG. 4 is an explanatory diagram illustrating a generation example of a shared space according to the embodiment.

FIG. 4 is an explanatory diagram illustrating a generation example of the shared space. As illustrated in FIG. 4, for example, a shared space generating unit 102 generates a shared space 40 by arranging the 3D data of the object 42a and the object 42b included in the stream received from the input unit 22 (transmitting unit 228) of the real space 2a and the real space 2b and the 3D data of the object 42c and the object 42d included in the stream received from the input unit 22 (transmitting unit 228) of the input unit 22 in the shared space 40.

Further, the server 10 can also generate a plurality of shared spaces. For example, the server 10 may generate a shared space A on the basis of the stream received from the input unit 22a (the transmitting unit 228) in the real space 2a and the stream received from the input unit 22b (the transmitting unit 228) in the real space 2b and generate a shared space B on the basis of the stream received from the input unit 22c (the transmitting unit 228) in the real space 2c and the stream received from the input unit 22d (the transmitting unit 228) in the real space 2d.

Further, the server 10 generates the content of the free viewpoint on the basis of the generated shared space, and then transmits the content to the output unit 24 of each real space 2.

Figure 5:
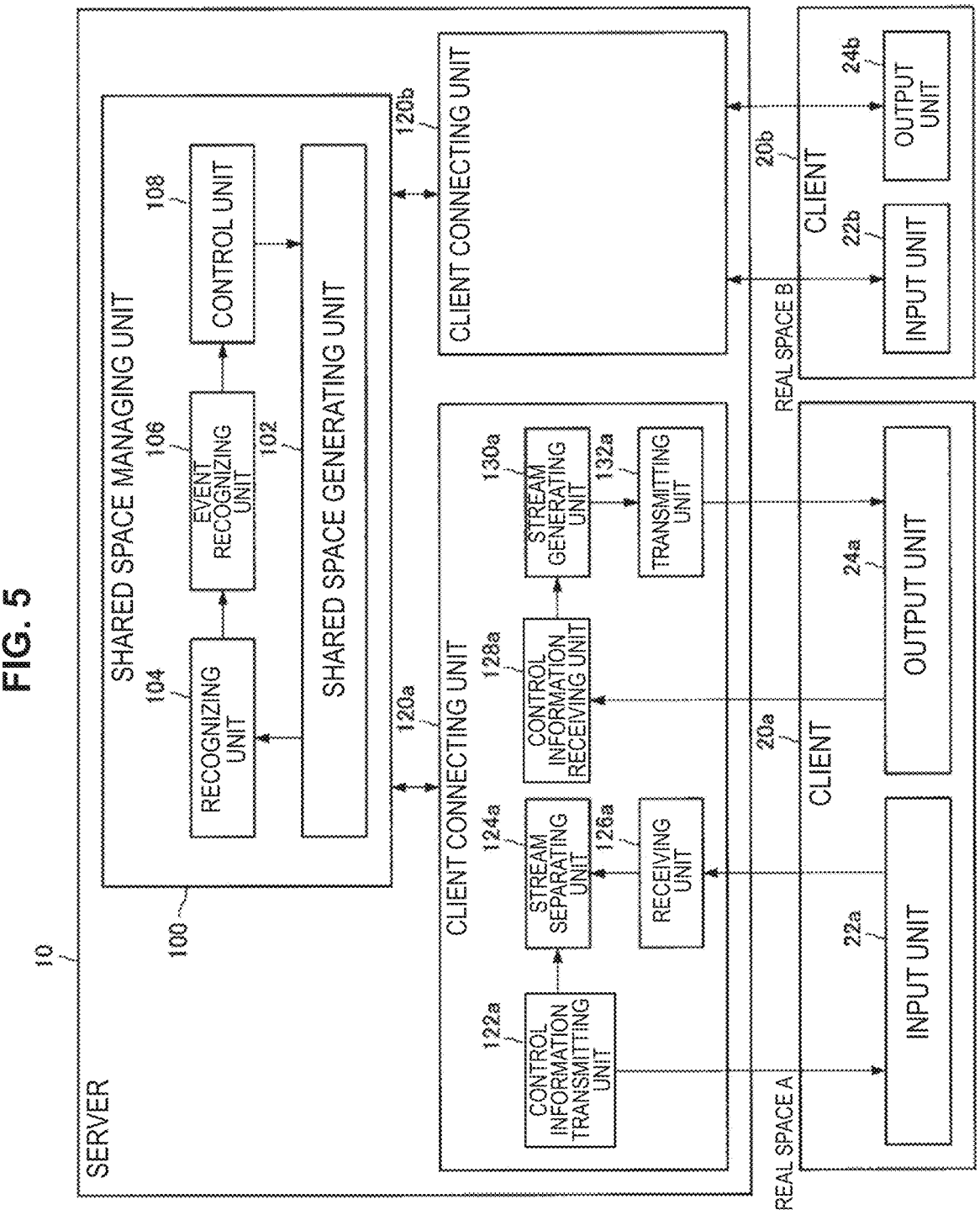
FIG. 5 is a functional block diagram illustrating a configuration example of a server 10 according to the embodiment.

FIG. 5 is a functional block diagram illustrating a configuration example of the server 10. As illustrated in FIG. 5, the server 10 has a shared space managing unit 100 and a plurality of client connecting units 120. Further, one client connecting unit 120 may be installed for each client 20 that is placed. Further, a pair (client relation) of the client connecting unit 120 and the client 20 may be preset.

{1-3-1. Client Connecting Unit 120}

The client connecting unit 120 transmits information transmitted from the shared space managing unit 100 to the client 20 of the connection destination. Further, the client connecting unit 120 transmits information received from the client 20 of the connection destination to the shared space managing unit 100.

Further, as illustrated in FIG. 5, each client connecting unit 120 includes a control information transmitting unit 122, a stream separating unit 124, a receiving unit 126, a control information receiving unit 128, a stream generating unit 130, and a transmitting unit 132.

{1-3-2. Receiving Unit 126}

The receiving unit 126 is an example of an acquiring unit in the present disclosure. The receiving unit 126 may include a communication device 912 to be described later (with reference to FIG. 25). The receiving unit 126 receives the stream from the input unit 22 (the transmitting unit 228) of the connection destination. Then, the receiving unit 126 transmits the received stream to the stream separating unit 124.

{1-3-3. Stream Separating Unit 124}

Figure 25:
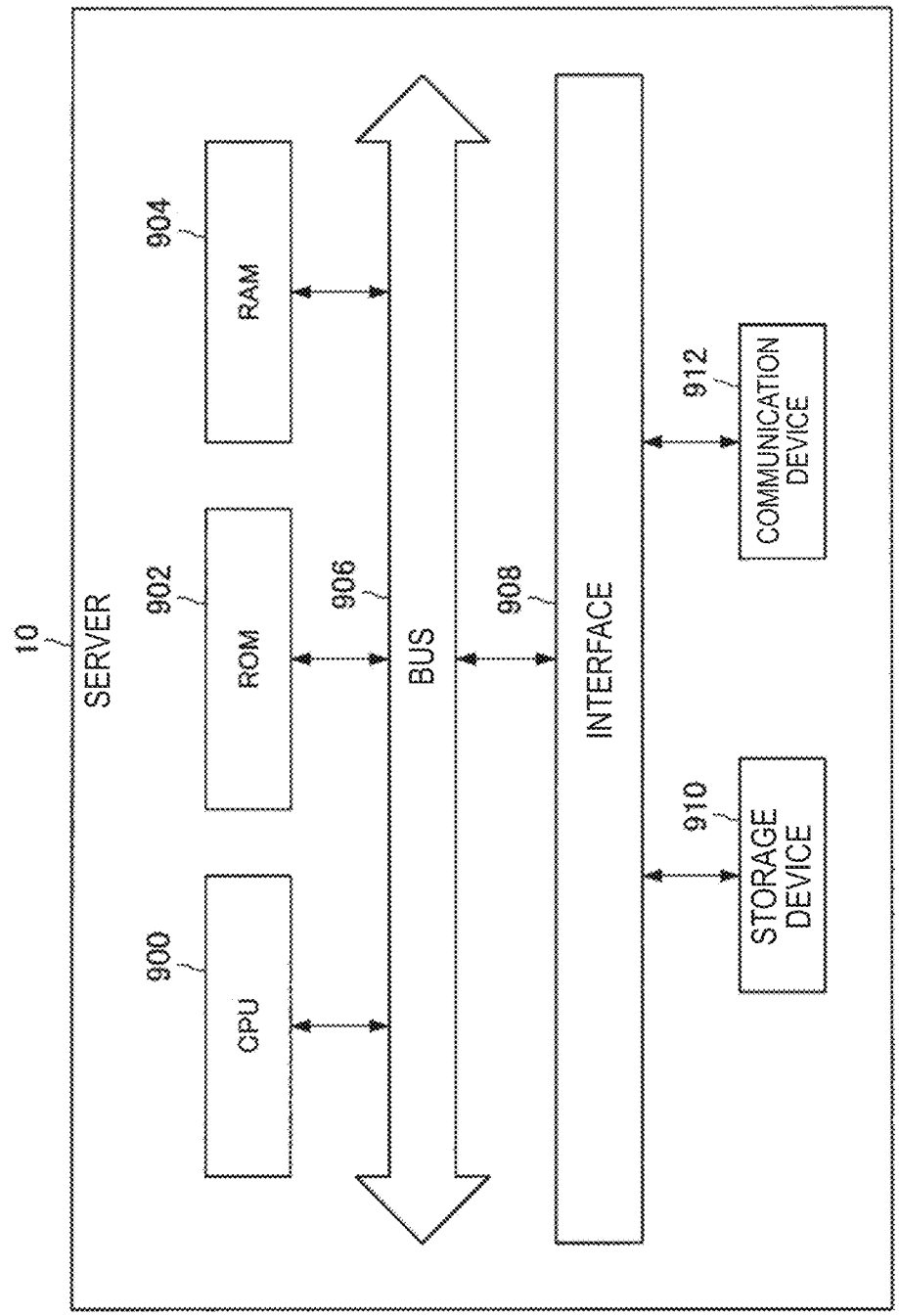
FIG. 25 is an explanatory diagram illustrating a hardware configuration of a server 10 according to the embodiment.

The stream separating unit 124 may include one or more process circuits (such as a CPU 900 to be described later with reference to FIG. 25). For example, the stream separating unit 124 demultiplexes the stream transmitted from the receiving unit 126 and separates the stream into 3D data and meta information in units of frames. Then, the stream separating unit 124 transmits the separated 3D data and meta information to the shared space generating unit 102.

{1-3-4. Control Information Transmitting Unit 122}

The control information transmitting unit 122 may include a communication device 912 that will be described later. The control information transmitting unit 122 transmits the first control information to the client 20 (the input unit 22) of the connection destination on the basis of an instruction of the shared space generating unit 102 described later. For example, the control information transmitting unit 122 generates information related to desired 3D data or meta information decided by the shared space generating unit 102 as the first control information, and transmits the first control information to the input unit 22. Accordingly, it is possible to curtail use of the network band and to reduce the recognition process on the client 20 side.

For example, in a case in which it is decided that the shared space generating unit 102 does not use a part of 3D data of a specific real space, the control information transmitting unit 122 includes content of the decision in the first control information, generates the first control information, and transmits the first control information to the input unit 22 of the real space. Accordingly, the input unit 22 of the transmission destination can perform control such that the data is not transmitted to the server 10.

{1-3-5. Control Information Receiving Unit 128}

The control information receiving unit 128 may include a communication device 912 that will be described later. The control information receiving unit 128 receives second control information from the output unit 24 (a control information transmitting unit 252) of the connection destination. Further, the control information receiving unit 128 transmits the received second control information to the shared space generating unit 102 and the stream generating unit 130. Here, the second control information may include information such as a detection result of a position or a posture of a display unit 246 (of output unit 24) to be described later.

{1-3-6. Stream Venerating Unit 130}

The stream generating unit 130 may include one or more process circuits (such as the CPU 900). The stream generating unit 130 generates a stream for the client 20 of the connection destination on the basis of shared space frame data generated by the shared space generating unit 102. Here, the shared space frame data may be data of one frame of the content of the free viewpoint related to the shared space. For example, the shared space frame data includes 3D data and meta information of each object in the shared space.

For example, the stream generating unit 130 generates the stream by multiplexing the 3D data, the meta information, and the like of the generated shared space. Further, in a case in which the second control information is transmitted from the control information receiving unit 128, the stream generating unit 130 can also generate the stream on the basis of the second control information. For example, the stream generating unit 130 generates the stream by excluding 3D data unnecessary for display indicated by the second control information from a stream to be generated or performing a process of lowering quality or the like.

Further, the stream generating unit 130 transmits the generated stream to the transmitting unit 132.

{1-3-7. Transmitting Unit 132}

The transmitting unit 132 may include a communication device 912 to be described later. The transmitting unit 132 transmits the stream transmitted from the stream generating unit 130 to the output unit 24 of the client 20 of the connection destination.

{1-3-8. Shared Space Managing Unit 100}

The shared space managing unit 100 may include one or more process circuits (such as the CPU 900). The shared space managing unit 100 comprehensively controls the operation of the server 10 using, for example, the CPU 900 and a random access memory (RAM) 904. Further, on the basis of the frame data received from the client 20 in each real space 2 and the second control information transferred from each client connecting unit 120, the shared space managing unit 100 generates the content of the free viewpoint (the shared space frame data). Further, the shared space managing unit 100 transmits the generated content of the free viewpoint to each client connecting unit 120.

Figure 6:
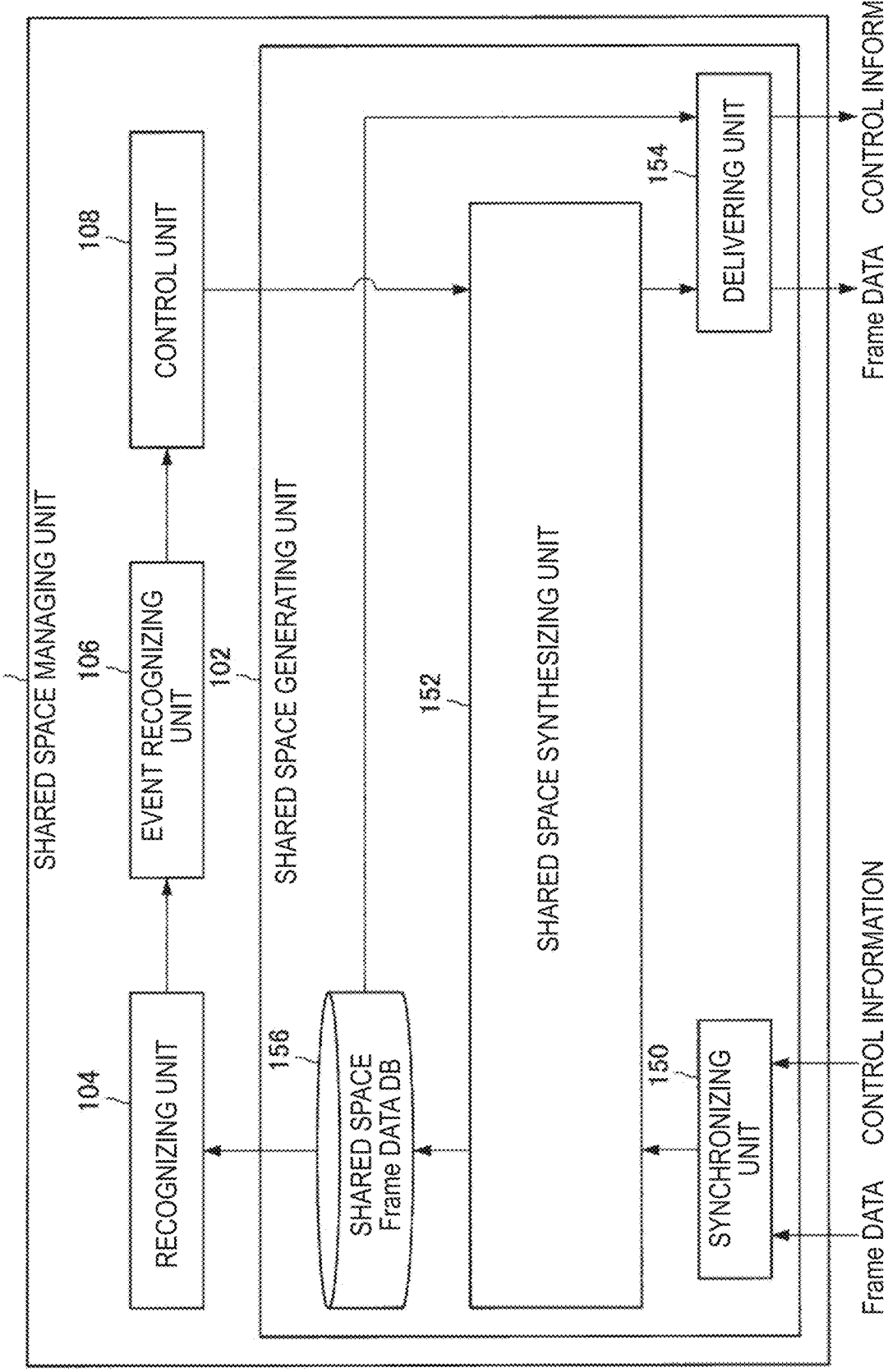
FIG. 6 is a functional block diagram illustrating a configuration example of a shared space managing unit 100 according to the embodiment.

FIG. 6 is a functional block diagram illustrating a further detailed configuration example of the shared space managing unit 100. As illustrated in FIG. 6, the shared space managing unit 100 includes a shared space generating unit 102, a recognizing unit 104, an event recognizing unit 106, and a control unit 108.

{1-3-9. Recognizing Unit 104}

The recognizing unit 104 performs various types of recognition processes such as face recognition, finger recognition, or bone recognition on the basis of the shared space frame data generated by the shared space generating unit 102. As will be described later in detail, for example, the recognizing unit 104 first acquires the shared space frame data from a shared space frame data DB 156 in a frame order. Then, the recognizing unit 104 performs various types of recognition processes on the basis of the acquired shared space frame data, and transmits the recognized result to the event recognizing unit 106.

Further, the recognizing unit 104 can reduce the recognition process (for example, omit a part thereof) using the meta information obtained from the stream received from each of a plurality of clients 20.

{1-3-10. Event Recognizing Unit 106}

The event recognizing unit 106 generates event information on the basis of chronological information transmitted from the recognizing unit 104. For example, in a case in which the user is participating in the generated shared space, and the user points at a desk located in the shared space, the event recognizing unit 106 generates information indicating that the desk is pointed at as the event information. Further, in a case in which it is recognized that the user lifts a laptop personal computer (PC) on a desk within a real space in which the user is located, the event recognizing unit 106 generates information indicating that the laptop PC is lifted as the event information.

Further, the event recognizing unit 106 transmits the generated event information to the control unit 108.

{1-3-11. Control Unit 108}

The control unit 108 generates third control information on the basis of the event information transmitted from the event recognizing unit 106. Then, the control unit 108 transmits the generated third control information to the shared space generating unit 102. Here, the third control information may be information used when the shared space is generated by the shared space generating unit 102.

{1-3-12. Shared Space Generating Unit 102}

The shared space generating unit 102 generates the shared space frame data on the basis of the frame data and the meta information obtained from the streams received from a plurality of clients 20 (that is, provided from a plurality of clients 20). Further, as illustrated in FIG. 6, the shared space generating unit 102 has a synchronizing unit 150, a shared space synthesizing unit 152, a delivering unit 154, and a shared space frame data DB 156.

{1-3-13. Synchronizing Unit 150}

The synchronizing unit 150 sequentially transmits the frame data and the second control information received from each of a plurality of clients 20 to the shared space synthesizing unit 152 together for each piece of information (for example, each frame) having the same timing.

{1-3-14. Shared Space Synthesizing Unit 152}

The shared space synthesizing unit 152 generates the shared space frame data on the basis of the frame data of each of a plurality of real spaces transmitted from the synchronizing unit 150. Further, the shared space synthesizing unit 152 stores the generated shared space frame data in the shared space frame data DB 156.

{1-3-15. Delivering Unit 154}

On the basis of the shared space frame data generated by the shared space synthesizing unit 152, the delivering unit 154 generates frame data to be transmitted to the output unit 24 in the real space for each real space. Then, the delivering unit 154 transmits each piece of generated frame data to the client connecting unit 120 corresponding to the real space of the transmission destination of the frame data.

1-4. Output Unit 24

The output unit 24 outputs the stream (for example, the content of the free viewpoint) received from the server 10. Accordingly, the user in the real space can experience as if the user were located in the generated shared space by viewing the output content.

As illustrated in FIG. 1, the output unit 24 may be a wearable device such as, for example, an HMD or augmented reality (AR) glasses. Further, the HMD may be a shielding type or a video transmission type. Further, the output unit 24 is not limited to the example of the wearable device but may be, for example, a projector and project the stream received from the server 10 onto a projection target (for example, a wall) in the real space. Alternatively, the output unit 24 may be constituted by a combination of a plurality of devices (for example, a combination of AR glasses and a projector). Further, the following description will proceed focusing on an example in which the output unit 24 is a wearable device.

Here, a configuration of the output unit 24 will be described in detail with reference to FIG. 2 again. As illustrated in FIG. 2, the output unit 24 includes a receiving unit 240, a stream separating unit 242, a synthesizing unit 244, a display unit 246, a sensor unit 248, a recognizing unit 250, and a control information transmitting unit 252.

{1-4-1. Receiving Unit 240}

The receiving unit 240 may include a communication device such as a network card. The receiving unit 240 receives the stream from the server 10. Further, the receiving unit 240 transmits the received stream to the stream separating unit 242.

{1-4-2. Stream Separating Unit 247}

The stream separating unit 242 may include one or more process circuits (such as a CPU). For example, the stream separating unit 242 demultiplexes the stream transmitted from the receiving unit 240 and separates the stream. Further, the stream separating unit 242 transmits the separated data to the synthesizing unit 244. Alternatively, the stream separating unit 242 may transfer the separated data to the display unit 246.

{1-4-3. Synthesizing Unit 244}

The synthesizing unit 244 may include one or more process circuits (such as a CPU). On the basis of the data transmitted from the stream separating unit 242 and the recognition result (for example, the recognition result of the position, the posture, or the like of the display unit 246 or the like) transmitted from the recognizing unit 250, the synthesizing unit 244 generates (renders) a 3D video (a virtual reality (VR) video, an AR video, or the like). Further, the synthesizing unit 244 transmits the generated video to the display unit 246.

{1-4-4. Display Unit 246}

The display unit 246 may be constituted by, for example, a liquid crystal display (LCD), an organic light emitting diode (OLED), or the like. Alternatively, the display unit 246 may display a video on a transmissive display. Alternatively, the display unit 246 may be a projector.

The display unit 246 displays the video generated by the synthesizing unit 244 or the video data transmitted from the stream separating unit 242.

{1-4-5. Sensor Unit 248}

The sensor unit 248 may include various types of sensors such as an RGB cameras, a global positioning system (GPS) receiver, an acceleration sensor, a gyroscope, and a geomagnetic sensor. For example, the sensor unit 248 detects information related to the position, the posture, and the like of the display unit 246. Further, the sensor unit 248 transmits the detected information to the recognizing unit 250.

Further, the sensor unit 248 may be constituted by a single device or a plurality of devices. Further, in a case in which it is constituted by a plurality of devices, information such as images acquired by a plurality of devices can be synthesized with a high degree of accuracy by calibration, a frame synchronization process, or the like.

{1-4-6. Recognizing Unit 250}

The recognizing unit 250 may include one or more process circuits (such as a CPU). The recognizing unit 250 performs the recognition process of the position, the posture, and the like of the display unit 246 on the basis of the information transmitted from the sensor unit 248. Further, the recognizing unit 250 may further recognize a viewpoint position of the user.

Further, the recognizing unit 250 transmits the recognized result to the synthesizing unit 244 and the control information transmitting unit 252.

{1-4-7. Control Information Transmitting Unit 252}

The control information transmitting unit 252 may include a communication device such as a network card. The control information transmitting unit 252 transmits the recognition result (recognition result of the position and the posture of the display unit 246 or the like) transmitted from the recognizing unit 250 to the server 10 as the second control information.

1-5. Communication Network 26

The communication network 26 is a wired or wireless transmission path of information transmitted from a device connected to the communication network 26. Examples of the communication network 26 may include a public line network such as a telephone network, the Internet, and a satellite communication network, various local area networks (LANs) including Ethernet (a registered trademark), and a wide area network (WAN). Further, the communication network 26 may include a dedicated network such as an Internet protocol-virtual private network (IP-VPN).

1-6. Modified Examples

1-6-1. Modified Example 1

Further, a configuration of the information processing system according to the present embodiment is not limited to the above example. For example, in the above description, the example in which one input unit 22 and one output unit 24 are arranged in each real space has been described, but the present disclosure is not limited to this example as long as one or more units are arranged in information processing system as each of the input unit 22 and the output unit 24. Further, there may be a real space in which only the input unit 22 or only the output unit 24 is arranged.

Further, although FIGS. 1 and 2 illustrate the example in which the input unit 22 and the output unit 24 are separately configured, the present disclosure is not limited to such an example. The input unit 22 and the output unit 24 may be integrally configured in one or more real spaces (for example, as a single device).

1-6-2. Modified Example 2

Further, the server 10 may be configured as a server on the cloud or may be configured on an associated client 20.

Further, in the above description, the example in which the shared space managing unit 100 is included in one server (that is, the server 10) has been described, but the present disclosure is not limited to this example. For example, the function of the shared space managing unit 100 may be realized by cooperation of a plurality of computers (not illustrated). Alternatively, the functions of the shared space managing unit 100 described above may be distributed to the respective clients 20, and the respective clients 20 may be configured to operate in cooperation.

1-6-3. Modified Example 3

Further, the client 20 may be configured as a single device or may be configured with a plurality of devices.

Further, in the above description, the sensor unit 220 of the input unit 22 and the sensor unit 248 of the output unit 24 are separately provided, but the present disclosure is not limited thereto. For example, the sensor unit 220 and the sensor unit 248 may be integrally configured, and the sensor unit may be shared by the input unit 22 and the output unit 24. Similarly, the recognizing unit 224 of the input unit 22 and the recognizing unit 250 of the output unit 24 are integrally configured, and the recognizing unit may be shared by the input unit 22 and the output unit 24.

1-6-4. Modified Example 4

Further, in the above description, the example in which the recognizing unit 224 (of the input unit 22), the recognizing unit 250 (of the output unit 24), and the recognizing unit 104 (of the server 10) are separately installed has been described, but the present disclosure is not limited to this example, and any one or two of the recognizing unit 224, the recognizing unit 250, and the recognizing unit 104 may not be installed. Further, in this case, another recognizing unit may be configured to further perform a process corresponding to the recognizing unit which is not installed.

1-6-5. Modified Example 5

Further, in the above description, the example in which the stream generating unit 226 of the input unit 22 and the stream generating unit 130 of the server 10 perform the multiplexing process has been described, but the stream generating unit 226 and the stream generating unit 130 may not perform the multiplexing process. In other words, data may be transmitted between the server 10 and the client 20 without undergoing the multiplexing process.

1-7. Description of Problem

The configuration example of the information processing system according to the present embodiment has been described above. Incidentally, in the shared space, it is desirable that another user can join, or the user who is currently participating can leave in the middle. In this case, when another user joins or when the user who is participating in leaves, it is desirable that the layout of the shared space or authority to access a device or the like in the shared space be adaptively changed in accordance with a desire of each user.

In this regard, the server 10 according to the present embodiment was invented in light of the foregoing. According to the present embodiment, in a case in which information indicating the start or the end of the use of the content of the free viewpoint by the user is acquired, the server 10 can change settings related to the use of the content of the free viewpoint on the basis of setting information related to the use start or the use end of the content. Here, for example, information indicating a detection result when the input unit 22 (the sensor unit 220 or the like) detects that a manipulation for starting or ending the use of the content of the free viewpoint is performed may be the information indicating the start or the end of the use of the content of the free viewpoint. Alternatively, information indicating a detection result when the server 10 (the shared space managing unit 100 or the like) determines that a manipulation for starting or ending the use of the content of the free viewpoint is performed on the basis of the stream received from the input unit 22 (the transmitting unit 228) may be the information indicating the start or the end of the use of the content of the free viewpoint. Further, the manipulation for starting or ending the use of the content of the free viewpoint can be performed, for example, by a manipulation, a gesture, a line of sight manipulation, or speech on a predetermined input device.

2. Detailed Description of Embodiment

<2-1. Configuration>

First, a configuration of the present embodiment will be described in detail. A feature of the configuration of the present embodiment relates to, particularly, a configuration of the shared space generating unit 102. The configuration of the shared space generating unit 102 will be described in further detail with reference to FIG. 7.

{2-1-1. Shared Space Generating Unit 102}

(2-1-1-1. Setting Information DB 160)

Figure 7:
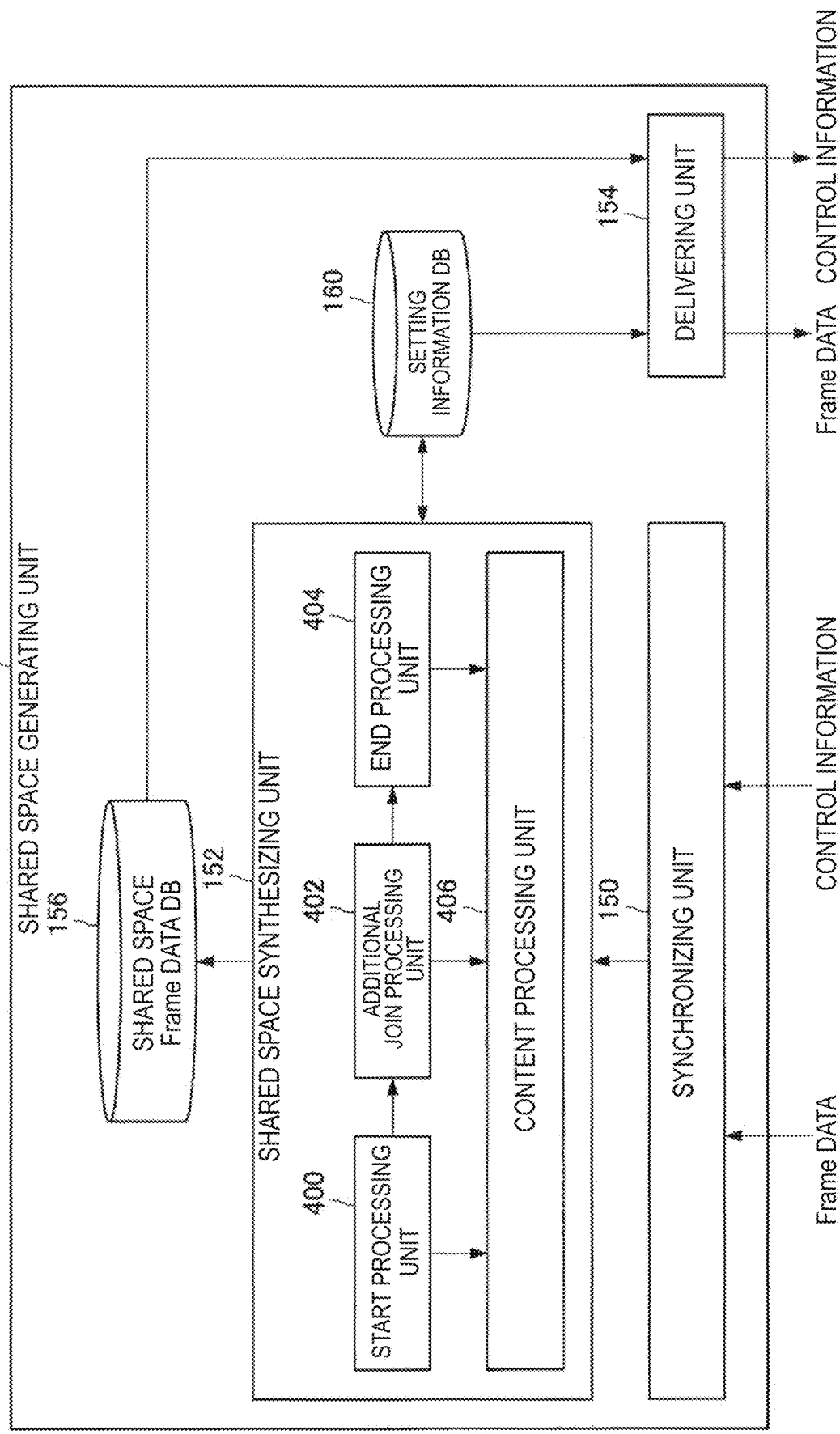
FIG. 7 is a functional block diagram illustrating a configuration example of a shared space generating unit 102 according to the embodiment.
Figure 8:
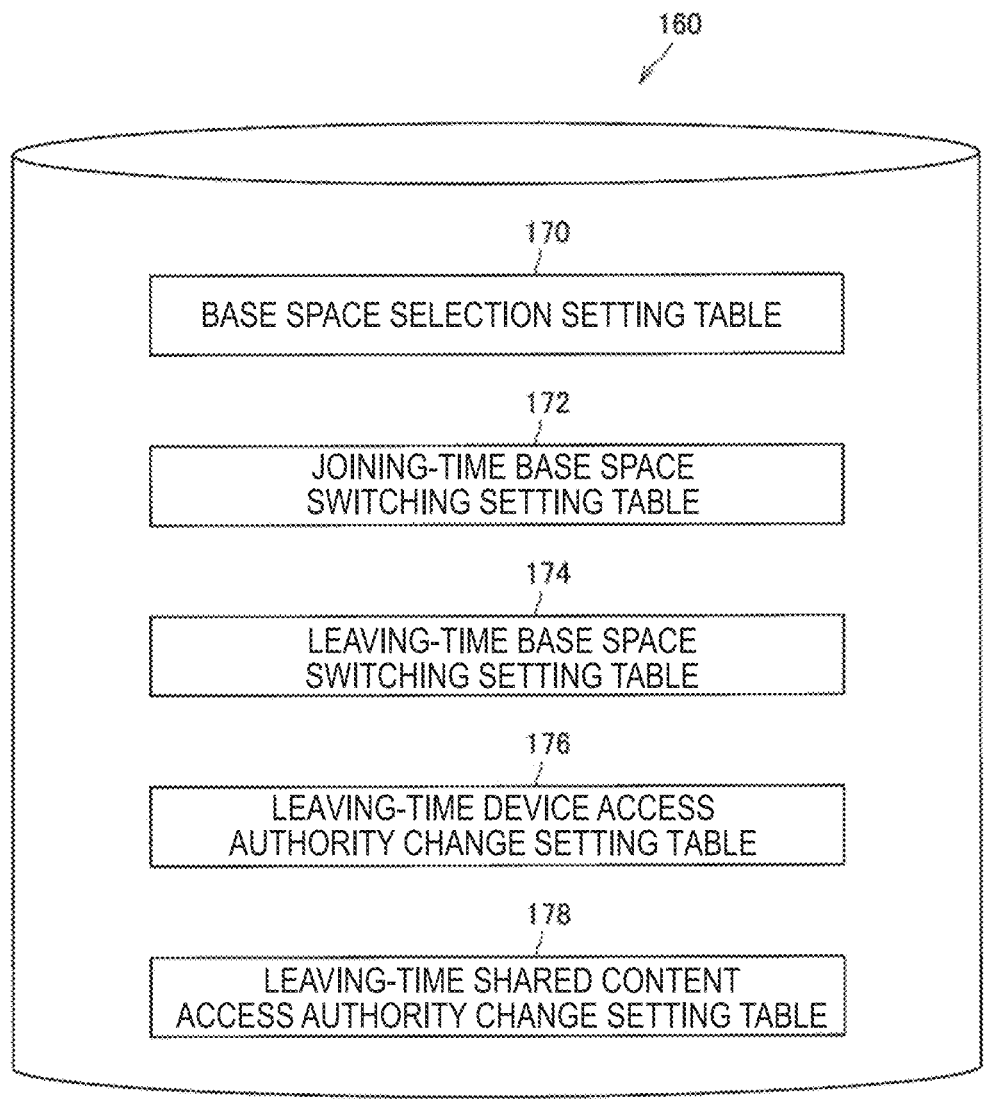
FIG. 8 is an explanatory diagram illustrating a configuration example of a setting information DB 160 according to the embodiment.

As illustrated in FIG. 7, the shared space generating unit 102 further includes a setting information DB 160. The setting information DB 160 is an example of first setting information and second setting information in the present disclosure. The setting information DB 160 is a database that stores setting information related to generation or change of the shared space corresponding to the content of the free viewpoint when the use of the free viewpoint content by the user is started or ended. FIG. 8 is a diagram illustrating a configuration example of the setting information DB 160. As illustrated in FIG. 8, the setting information DB 160 includes, for example, a base space selection setting table 170, a joining-time base space switching setting table 172, a leaving-time base space switching setting table 174, a leaving-time device access authority change setting table 176, and a leaving-time shared content access authority change setting table 178. Further, specific content of each table will be described later.

Further, the registered content of the setting information DB 160 can be referred to or changed via the client 20 by the user in each real space 2. For example, in a case in which the output unit 24 (the display unit 246) in each real space 2 is displaying a setting screen, the user in each real space 2 may be able to refer to or change the registered content of the setting information DB 160 by a predetermined input method (for example, a manipulation, a gesture, a line of sight manipulation, a speech, or the like to a predetermined input device). Alternatively, in a case in which the user is participating in the shared space, the user may be able to refers to or change the registered content of the setting information DB 160 through recognition of a gesture or a voice of the user in the shared space. Further, in the setting information DB 160, each user may be able to change only a setting value associated with the user or the real space in which the user is located.

{2-1-2. Shared Space Synthesizing Unit 152}

As illustrated in FIG. 7, the shared space synthesizing unit 152 includes a start processing unit 400, an additional join processing unit 402, an end processing unit 404, and a content processing unit 406.

{2-1-3. Start Processing Unit 400}

(2-1-3-1. Whether or Not Content of Free Viewpoint is Generated)

In a case in which the content of the free viewpoint is not generated, the start processing unit 400 decides whether or not the content of the free viewpoint is generated on the basis of a predetermined start condition. Further, in a case in which it is decided that the content of the free viewpoint is generated, the start processing unit 400 generates the content of the free viewpoint (the shared space frame data).

For example, in a case in which a predetermined start condition is satisfied, the start processing unit 400 decides that the content of the free viewpoint is generated. Further, in a case in which the predetermined start condition is not satisfied, the start processing unit 400 decides that the content of the free viewpoint is not generated.

Start Condition: Selection of User of Other Party

Here, in a situation that the space is not shared, the predetermined start condition may be satisfied when manipulation of a certain user 4a to select a user 4b of the other party with whom the user 4a desires to share the space (to start the space sharing) is detected by the input unit 22 (such as the sensor unit 220), and the detection result is received from the input unit 22 (the transmitting unit 228). Further, as a method of selecting the other user, for example, the other user 4b may be selected, for example, by a manipulation, a gesture, a line of sight manipulation, a speech, or the like to a predetermined input device from a user list displayed on the display unit 246 viewed by the user 4a. Alternatively, the user 4a may select the user 4b of the other party by speaking a user name of the other party directly.

For example, when the certain user 4a selects the user 4b of the other party, and a manipulation to start the space sharing is detected by the input unit 22, and a detection result is received from the input unit 22, the start processing unit 400 decides whether or not the content of the free viewpoint is generated on the basis of the registered content of the base space selection setting table 170 in the setting information DB 160.

As an example, the start processing unit 400 decides whether or not the content of the free viewpoint is generated by comparing the setting value associated with the user 4a with the setting value associated with the user 4b in the base space selection setting table 170. For example, in a case in which at least one of candidates of a desired base space associated with the user 4a matches at least one of candidates of a desired base space associated with the user 4b in the base space selection setting table 170, the start processing unit 400 decides that the content of the free viewpoint is generated, and decided the matched base space candidate as the base space. Here, the base space is a space which is the basis of the generated shared space. For example, any one of a plurality of real spaces in which each user participating in the shared space is located may be decided as the base space. Further, objects located in all the real spaces not selected as the base space among a plurality of real spaces can be placed in the base space (for example, an empty region on the base space).

More specifically, in a case in which there is only one matching base space candidate, the start processing unit 400 decides the base space candidate as the base space. Further, in a case in which there are a plurality of matching base space candidates, the start processing unit 400 presents a plurality of base space candidates to one of the user 4a and the user 4b, and decides the base space candidate selected by the user as the base space. Here, the user of the presentation target may be, for example, the user 4 who performs a manipulation to start the space sharing or may be a user who is highest in a predetermined priority. Alternatively, the start processing unit 400 may present a plurality of base space candidates for the two users 4 (the user 4a and the user 4b) and decide a base space candidate agreed by the two users 4 as the base space.

Further, in a case in which the desired base space candidate associated with the user 4a does not match the desired base space candidate associated with the user 4b in the base space selection setting table 170, the start processing unit 400 decides that the content of the free viewpoint is not generated. Further, at this time, the start processing unit 400 may cause the output unit 24a (for example, the display unit 246) in the real space 2a in which the user 4a is located and the output unit 24b (for example, the display unit 246) in the real space 2b in which the user 4b is located to output information indicating an error.

Start, Condition: Selection of Space

Further, a predetermined start condition may be satisfied when, in a situation in which the space is not shared, a manipulation of a certain user 4a to selects the real space (that is, the base space) serving as the basis of the shared space (in order to start the space sharing) is detected by the input unit 22 (such as the sensor unit 220), and the detection result is received from the input unit 22 (the transmitting unit 228). Further, as a method of selecting the real space, for example, the real space may be selected by the user 4a, for example, by a manipulation, a gesture, a line of sight manipulation, a speech, or the like to a predetermined input device from a space list displayed on the display unit 246 viewed by the user 4a, or the real space may be selected when the user 4a speaks a name of a desired real space directly.

For example, the start processing unit 400 decides whether or not the content of the free viewpoint is generated by comparing the setting value associated with the user 4a with the setting value associated with the user 4b located in the selected real space or the real space in the base space selection setting table 170. For example, in a case in which the setting value associated with the user 4a indicates the "real space of other user is used as base space," and the setting value associated with the user 4b located in the selected real space indicates "any space is okay" in the base space selection setting table 170, the start processing unit 400 decides that the content of the free viewpoint is generated, and decides the selected real space as the base space.

(2-1-3-2. Base Space Selection Setting Table 170)

The base space selection setting table 170 is a table in which setting information related to the selection of the base space is stored. For example, in the base space selection setting table 170, the user ID and the setting value may be associated with each other, or the real space and the setting value may be associated with each other. Further, in the latter case, regardless of the user who is located in the real space, even in a case in which there is no user in the real space, the same setting value applies to the selection of the base space. Alternatively, the user ID, the real space, and the setting value may be associated in the base space selection setting table 170.

Here, for example, "my real space is used as base space," "real space of other user is used as base space," "any space is okay," or the like is registered as the setting value. In this case, in a case in which the setting value associated with the user 4a is "my real space is used as base space" and the setting value associated with the user 4b is "any space is okay" in the base space selection setting table 170, the start processing unit 400 decides that the content of the free viewpoint is generated and decides the real space 2a (in which the user 4a is located) as the base space.

Alternatively, identification information of the real space such as, for example, "real space A," "real space B," or "real space C" can be registered as the setting value. In this case, in a case in which the setting value associated with the user 4a is "real space A, real space C, and real space D," and the setting value associated with the user 4b is "real space B and real space C" in the base space selection setting table 170, only "real space C" coincides between both setting values. Therefore, the start processing unit 400 decides that the content of the free viewpoint is generated and decides "real space C" as the base space.

(2-1-3-3. Generation of Contents of Free Viewpoint)

Further, in a case in which it is decided that the content of the free viewpoint is generated, the start processing unit 400 generates the content of the free viewpoint by generating the shared space on the basis of the decided base space. For example, the start processing unit 400 first decides the base space on the basis of the registered content of the setting information DB 160. Then, the start processing unit 400 generates the shared space by placing objects in the real space which is not the base space on the base space. Further, the start processing unit 400 generates the shared space frame data on the basis of the shared space.

Figure 10:
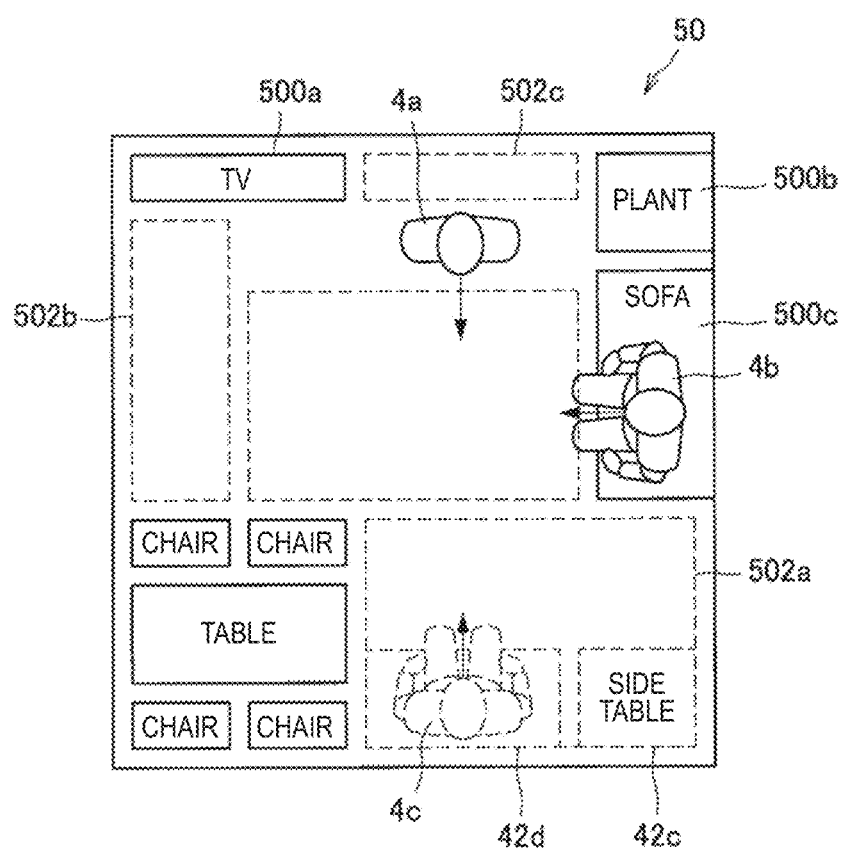
FIG. 10 is an explanatory diagram illustrating a part of a generation example of a shared space according to the embodiment.

Here, a generation example of the shared space will be described in further detail with reference to FIGS. 9A, 9B, and 10. Further, FIGS. 9A, 9B, and 10 show a generation example of the shared space in a situation in which the real space 2a is decided as the base space. Further, FIGS. 9A, 9B, and 10 illustrates an example in which the shared space is generated by placing the object in the real space 2b in the base space (that is, the real space 2a). Further, FIGS. 9A, 9B, and 10 show top views of the real space 2a and the real space 2b.

For example, as illustrated in FIG. 9A, the start processing unit 400 first generates base space layout information 50 illustrated in a right diagram of FIG. 9A on the basis of a result of object separation and object recognition (by the input unit 22) for the real space 2a (decided as the base space). At this time, as illustrated in the right diagram of FIG. 9A, the start processing unit 400 also calculates information (a position, a bottom area, and the like) of an empty region 502 in the base space, and generate the base space layout information 50. Further, as illustrated in FIG. 9B, each object 42 in the real space 2b is specified on the basis of a result of object separation and object recognition (by the input unit 22) for the real space 2b as illustrated in a right diagram of FIG. 9B.

Then, as illustrated in FIG. 10, the start processing unit 400 places each object 42 in the real space 2b on the base space on the basis of the base space layout information 50.

(2-1-3-4. Granting of Authority to User)

Further, in a case in which it is decided that the content of the free viewpoint is generated, the start processing unit 400 can grant authority to access the object in the base space to the user 4b located in the real space other than the base space among one or more the user 4 (initially) participates in the shared space. For example, the start processing unit 400 grants (unconditionally) authority to access a device in the base space to the user 4b. Here, the device may include a home network device, an Internet of things (IoT) device, or the like. For example, the device includes an audio-visual (AV) device, a lighting device, an air conditioner, or the like.

Further, in a case in which reproduction of certain content is started in the base space after the content of the free viewpoint is generated, the start processing unit 400 can provide (share) information for enabling the content in the real space other than the base space to be reproduced (hereinafter referred to as "reproduction information") to (with) the user 4b located in the real space. Here, the reproduction information may include, for example, channel information of a program displayed by a television receiver in the shared space and a uniform resource locator (URL) of a web page displayed on a web browser being activated on a predetermined terminal in the shared space. Further, the reproduction information may include a URL of network streaming content (such as video streaming content), information of a current reproduction time, authority information of the user 4a located in (the same place as) the base space related to the network streaming content, and the like. According to such process examples, the user 4b located in the real space different from the base space can also freely access the device in the base space or shared content in the base space. For example, the user 4b can reproduce the content at the same timing as the reproduction timing of the shared content being reproduced in the base space. Therefore, it is possible to give the user 4a and the user 4b a sensation as if they were together in the same space.

{2-1-4. Additional Join Processing Unit 402}
(2-1-4-1. Determination of Switching of Base Space)

After the generation of the content of the free viewpoint, in a case in which a manipulation of a new user 4a to join the shared space corresponding to the content of the free viewpoint is detected, the additional join processing unit 402 decides whether or not the base space corresponding to the shared space is changed on the basis of a predetermined condition. Here, the manipulation of the new user 4a to join the shared space may be, for example, a manipulation of the user 4a to select a shared space which the user 4a desires to join by a manipulation, a gesture, a line of sight manipulation, a speech, or the like to a predetermined input device from a shared space list displayed on the display unit 246 viewed by the user 4a or may be speaking a name of a desired shared space (or the base space corresponding to the shared space) directly by the user 4a.

Decision Example 1

For example, the additional join processing unit 402 decides whether or not the current base space is changed on the basis of the setting value associated with the user 4a in the base space selection setting table 170. For example, in a case in which the setting value associated with the user 4a in the base space selection setting table 170 indicates "real space of other user is used as base space" or "any space is okay," the additional join processing unit 402 decides that the current base space is not changed. Alternatively, in a case in which a desired base space candidate is registered in the base space selection setting table 170 in association with the user 4a, and there is a base space corresponds to the shared space among candidates of the desired base space, the additional join processing unit 402 decides that the current base space is not changed. In other words, a priority is given to the current base space. Accordingly, since frequent switching of the base space is prevented, it is possible to suppress the influence on the activity of the user participating in the shared space. Further, at this time, the participation of the user 4a in the shared space may be permitted.

Further, in a case in which there is no base space corresponding to the shared space among the candidates of the desired base space associated with the user 4a in the base space selection setting table 170, the additional join processing unit 402 may decide whether or not the current base space is changed on the basis of responses to an inquiry about the switching of the base space from all the users 4b participating in the shared space. For example, the additional join processing unit 402 first presents one or more desired base space candidates associated with the user 4a in the base space selection setting table 170 to all the users 4b participating in the shared space. Then, only in a case in which all the user 4b agrees to switch the base space to one of the one or more base space candidates, the additional join processing unit 402 decides that the current base space is switched to the base space candidate.

Decision Example 2

Further, the additional join processing unit 402 can also decide whether or not the current base space is changed on the basis of the setting value associated with each of all the users 4b participating in the shared space in the joining-time base space switching setting table 172. For example, in a case in which at least one or more of the setting values associated with the users 4b participating in the shared space in the joining-time base space switching setting table 172 indicate "switching of base spaces is not permitted," the additional join processing unit 402 decides that the current base space is not changed. Further, in a case in which all the setting values associated with the users 4b participating in the shared space in the joining-time base space switching setting table 172 indicate "switching of base spaces is permitted," the additional join processing unit 402 may decide whether or not the current base space is not changed on the basis of the responses to the inquiry about the switching of the base space from all the users 4b participating in the shared space. According to the decision example 2, in a case in which other users desire to join the shared space, it is possible to present each of the users who are already participating in the shared space from being required to answer about whether or not the base space is switched each time. For this reason, the burden on each user is reduced.

Participation-Time Base Space Switching Setting Table 172

The joining-time base space switching setting table 172 is a table that stores setting information related to whether or not the switching of the base space is permitted in a case in which other users desire to newly join the shared space. For example, in the joining-time base space switching setting table 172, the user ID and the setting value may be associated, the real space and the setting value may be associated, or the user ID, the real space, and the setting value may be associated. Here, "switching of base space is permitted," "switching of base space is not permitted," and the like can be registered as the setting value.

(2-1-4-2. Granting of Authority to New User)

Further, in a case in which the new user 4a is permitted to join the shared space, the additional join processing unit 402 can grant authority to access the object in the base space to the new user 4a or provide the reproduction information to the new the user 4a. Further, specific content is substantially similar to that of the start processing unit 400 described above.

{2-1-5. End Processing Unit 404}

(2-1-5-1. Whether or Not Content of Free Viewpoint is Generated)

The end processing unit 404 is an example of a use restricting unit in the present disclosure. In a case in which information indicating the end of the use of the content of the free viewpoint by the user 4a sharing the content of the free viewpoint is acquired, the end processing unit 404 sets restriction related to the use of the content of the free viewpoint by the other user 4b sharing the content of the free viewpoint on the basis of registered content of the setting information DB 160. Here, the restriction related to the use of the content of the free viewpoint may include restrictions related to the use of the base space corresponding to the content of the free viewpoint and/or the object in the base space.

For example, the end processing unit 404 sets restrictions related to the use of the content of the free viewpoint by the other user 4b on the basis of a determination result of whether or not the real space in which the user 4a (hereinafter referred to as an "leaving user 4a") who performs a manipulation to end the use of the content is located is identical to the base space. As an example, in a case in which it is decided that the real space in which the leaving user 4a is located is identical to the base space, the end processing unit 404 decides whether or not the base space is changed on the basis of the registered content of the leaving-time base space switching setting table 174 in the setting information DB 160. For example, the end processing unit 404 decides whether or not the base space is changed on the basis of the setting value associated with the leaving user 4a (or the real space in which the leaving user 4a is located) in the leaving-time base space switching setting table 174.

Further, in a case in which it is decided that the real space in which the leaving user 4a is located is not identical to the base space, the end processing unit 404 decides that the base space is not changed.

(2-1-5-2. Leaving-Time Base Space Switching Setting Table 174)

The leaving-time base space switching setting table 174 is a table that stores setting information related to the change of the base space, for example, when the user 4 located in the same real space as the base space leaves the shared space. For example, in the leaving-time base space switching setting table 174, the user ID and the setting value may be associated, the real space and the setting value may be associated, or the user ID, the real space, and the setting value may be associated.

Here, as the setting value, for example, "connection with base space is deleted," "state in which base space can be accessed in real time is maintained," and "base space is maintained without change at time of leaving" can be registered.

As an example, in a case in which the setting value associated with the leaving user 4a indicate "state in which base space can be accessed in real time is maintained" in the leaving-time base space switching setting table 174, the end processing unit 404 decides that the current base space is not changed.

Further, in a case in which the setting value associated with the leaving user 4a indicates "connection with base space is deleted" in the leaving-time base space switching setting table 174, the end processing unit 404 decides that the base space is changed, and decides a new base space on the basis of the setting value associated with each of the other users 4b sharing the content of the free viewpoint in the leaving-time base space switching setting table 174. For example, in this case, the end processing unit 404 first compares candidates of a desired base space associated with the other users 4b in the base space selection setting table 170, and decides a matching base space candidate as a new base space. Further, at this time, all the access authorities granted to each of the other user 4b related to the (actual) device in the base space before the change can be revoked.

Further, in a case in which the setting value associated with the leaving user 4a indicates "base space is maintained without change at time of leaving" in the leaving-time base space switching setting table 174, the end processing unit 404 may disconnect the connection with the current base space and save the base space as a virtual object. For example, in this case, the end processing unit 404 first sets a virtual space newly and copies the object in the current base space onto the virtual space. Then, the end processing unit 404 associates all pieces of shared content which can be reproduced in the base space with the object in the virtual space (accordingly, authority to manage all pieces of shared contents is associated with the object in the virtual space.). Then, the end processing unit 404 changes the authority to access the reproduction information of all pieces of shared content by the other user 4b participating in the shared space on the basis of the setting value associated with the leaving user 4 in the leaving-time shared content access authority change setting table 178 to be described later.

(2-1-5-3. Change of Authority to Access Device)

Further, in a case in which it is decided that the current base space is not changed, the end processing unit 404 can change the authority to access one or more objects in the base space by the other user 4b participating in the shared space on the basis of the registered content of the leaving-time device access authority change setting table 176 in the setting information DB 160.

Leaving-Time Device Access Authority Change Setting Table 176

The leaving-time device access authority change setting table 176 is a table that stores setting information related to the change of the access authority of the other user 4b related to the device in the base space, for example, when the user 4a located in the same real space as the base space leaves the shared space. For example, in the leaving-time device access authority change setting table 176, the user ID and the setting value may be associated with each other, or the real space and the setting value may be associated with each other. In the latter case, for example, in a case in which the real space is "living room," "all access authorities are revoked" may be set, and in a case in which the real space is "conference room," "access authority is left without change" may be set. As described above, a level of privacy protection can be customized depending on a place. Alternatively, in the leaving-time device access authority change setting table 176, the user ID, the real space, and the setting value may be associated.

Here, as the setting value, for example, "access authority is left without change," "all access authorities are revoked," "it is designated whether or not access authority is revoked for each device," and the like may be registered. In this case, in a case in which the setting value associated with the leaving user 4a indicates "all access authorities are revoked" in the base space selection setting table 170, the end processing unit 404 changes the access authority of the other user 4b so that the other user 4b participating in the shared space is prohibited from accessing all devices in the base space after the leaving user 4a leaves the shared space (that is, after the leaving user 4a ends the use of the content of the free viewpoint).

(2-1-5-4. Change of Authority to Access Shared Content)

Further, in a case in which the setting value associated with the leaving user 4 indicates "base space is maintained without change at time of leaving" in the leaving-time base space switching setting table 174, the end processing unit 404 changes the authority to access the shared content (for example, video streaming content or the like) which can be reproduced in the base space before the change by the other user 4b participating in the shared space on the basis of the registered content of the leaving-time shared content access authority change setting table 178 in the setting information DB 160.

Leaving-Time Shared Content Access Authority Change Setting Table 178

The leaving-time shared content access authority change setting table 178 is a table that stores setting information related to the change of the access authority of the other user 4b related to the shared content which is reproduced in the base space, for example, when the leaving user 4a located in the same real space as the base space leaves the shared space. For example, in the leaving-time shared content access authority change setting table 178, the user ID and the setting value may be associated with each other, the real space and the setting value may be associated, or the user ID, the real space, and the setting value may be associated with each other.

Here, as the setting value, for example, "access authority is left without change;" "all access authorities are revoked," "it is designated whether or not access authority is revoked for each content, and the like may be registered. For example, in a case in which the setting value registered in the base space selection setting table 170 in association with the leaving user 4a indicates "to all access authorities are revoked," the end processing unit 404 changes the access authority of the other user 4b so that the other user 4b participating in the shared space is prohibited from accessing all pieces of shared content which can be reproduced in the base space after the leaving user 4a leaves the shared space.

{2-1-6. Content Processing Unit 406}

(2-1-6-1. When Object is Added)

The content processing unit 406 process the content of the free viewpoint so that the change of the content of the free viewpoint based on the joining of the new user to the shared space corresponding to the generated content of the free viewpoint or the leaving of the user from the shared space can be noticed.

For example, in a case in which it is decided that a new object (including the user 4) is placed in the shared space (for example, in a case in which the new user joins the shared space or the like), the content processing unit 406 process the content of the free viewpoint so that the user participating in the shared space can notice that the new object is to be displayed. As an example, the content processing unit 406 processes the content of the free viewpoint so that an animation of a predetermined period of time (for example, one minute) indicating that display of the new object is started is displayed.

Figure 11:
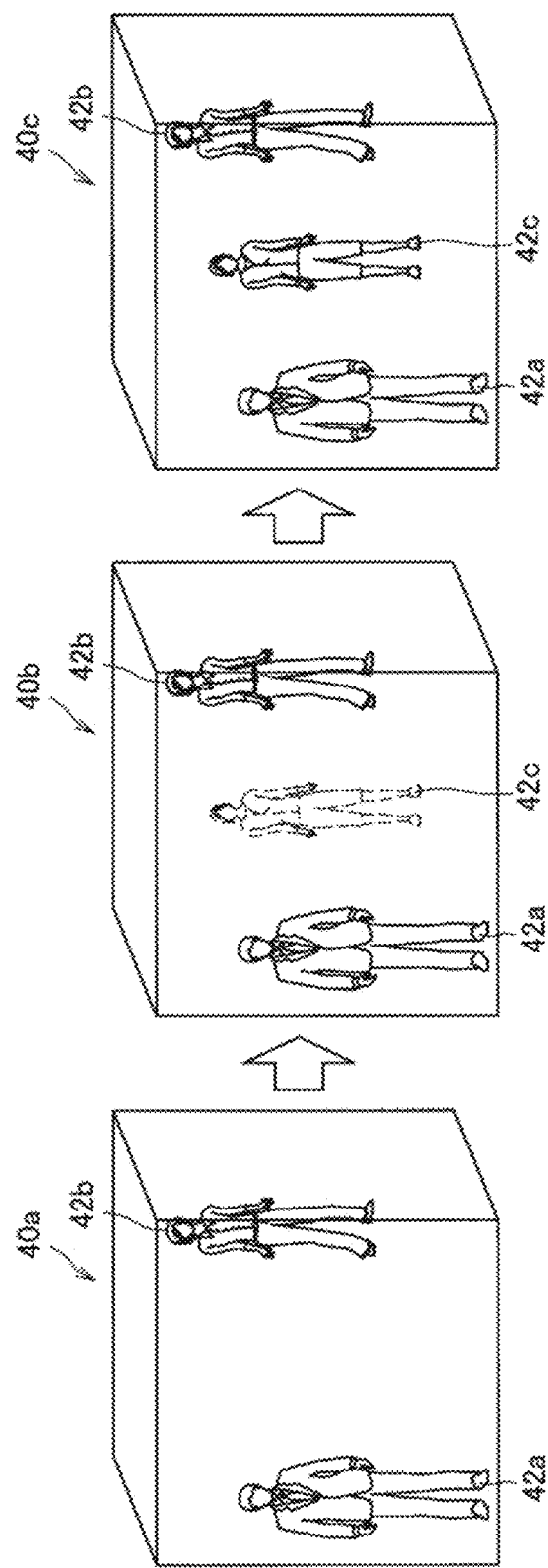
FIG. 11 is a diagram illustrating an example of an animation illustrating that display of a new object is started according to the embodiment.
Figure 12:
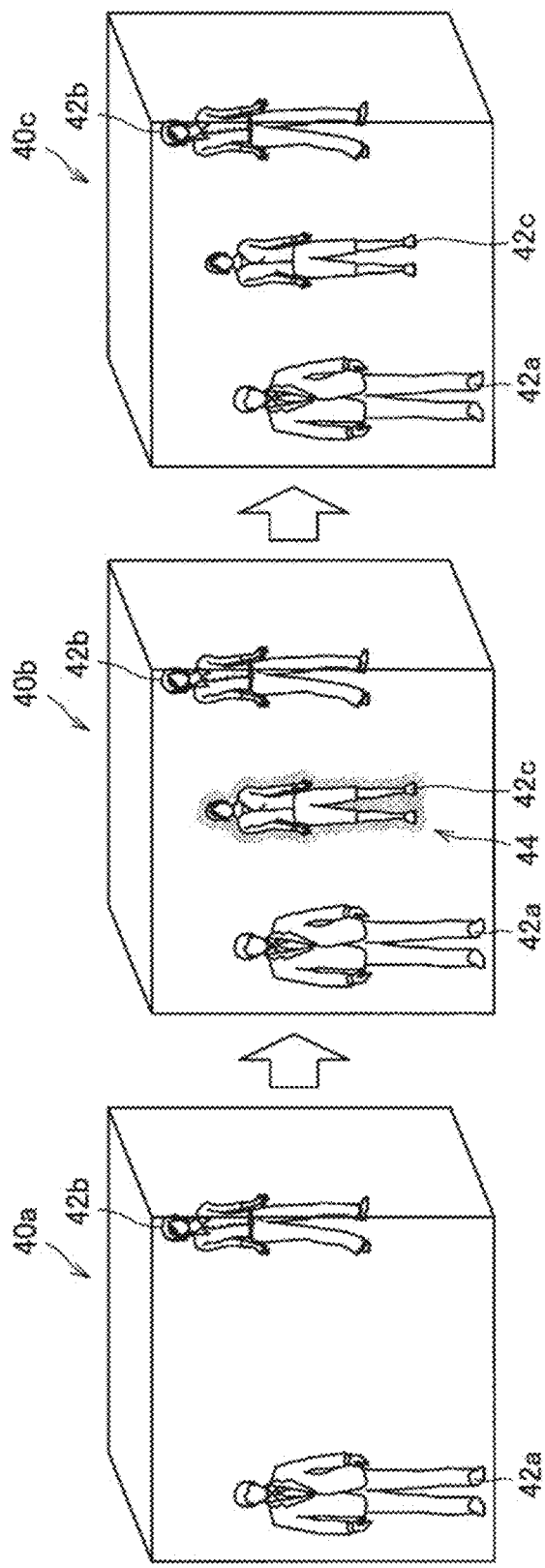
FIG. 12 is a diagram illustrating an example of an animation illustrating that display of a new object is started according to the embodiment.
Figure 13:
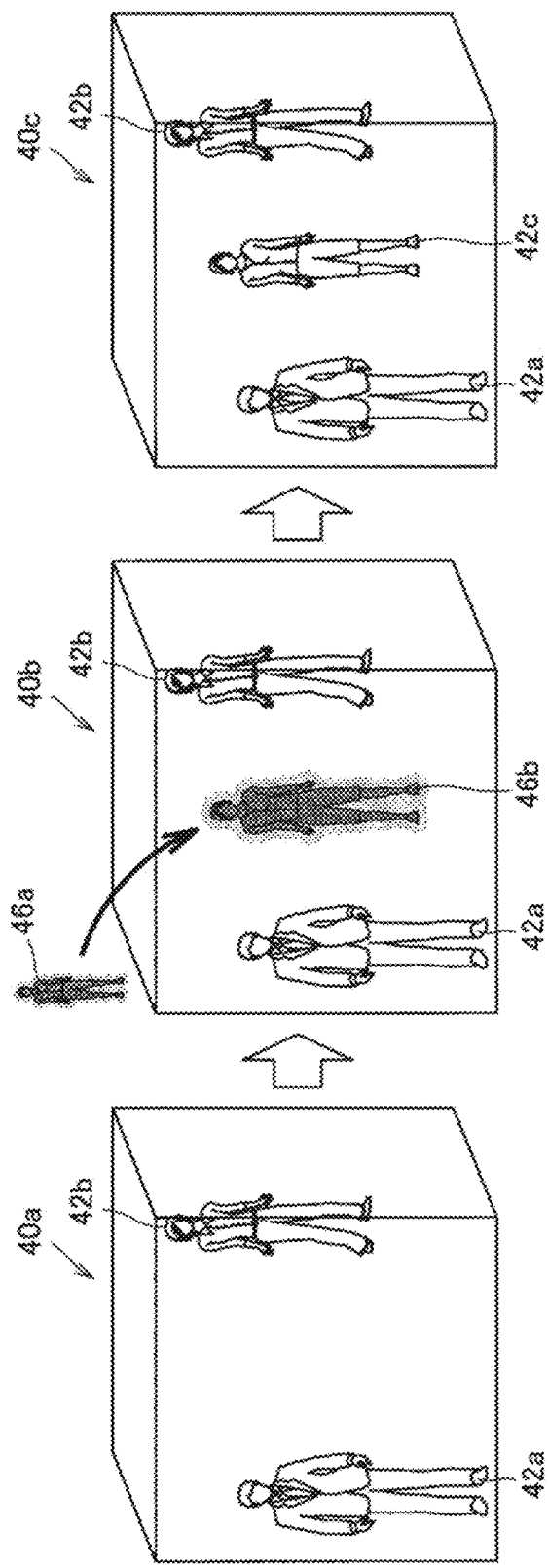
FIG. 13 is a diagram illustrating an example of an animation illustrating that display of a new object is started according to the embodiment.

Here, the above-described function will be described in further detail with reference to FIGS. 11 to 13. Further, FIGS. 11 to 13 illustrate an example in which the shared space 40 is generated in the order of a shared space 40a, a shared space 40b, and a shared space 40c with the passage of time. For example, in a case in which the display of the new object 42c is started, the content processing unit 406 first performs a process of causing a new object 42c whose transparency is set to an initial value (for example, 100%) to be displayed and gradually decrease the transparency of the new object 42c from the initial value to 0% during a predetermined period of time as illustrated in FIG. 11. Alternatively, as illustrated in FIG. 12, the content processing unit 406 may process the content of the free viewpoint so that a particle 44 is displayed in the periphery of the new object 42c for a predetermined period of time after the display of the new object 42c is started. Alternatively, as illustrated in FIG. 13, the content processing unit 406 processes the content of the free viewpoint so that an animation in which a small particle group 46 fly from the outside of the shared space 40, the particle group 46 gradually increases in the shared space 40, and then the particle group 46 is switched to display of the object 42c is displayed. According to such process examples, for example, in a case in which a new object (a new user or the like) is placed in the shared space, the object is not suddenly displayed. Therefore, each user who is already participating in the shared space can be prevented from feeling uncomfortable and surprised.

Further, the content processing unit 406 may process the content of the free viewpoint so that a predetermined effect sound is output at a timing at which a new object is displayed.

(2-1-6-2. When Object is Deleted)

Further, in a case in which it is decided that one or more objects (including the user 4) in the shared space are deleted from the shared space (for example, in a case in which the user participating in the shared space leaves the shared space or the like), the content processing unit 406 processes the content of the free viewpoint so that the user participating in the shared space can notice that the object is deleted. For example, the content processing unit 406 processes the content of the free viewpoint so that an animation of a predetermined period of time example, one minute) indicating that the display of the object is ended is displayed.

Figure 14:
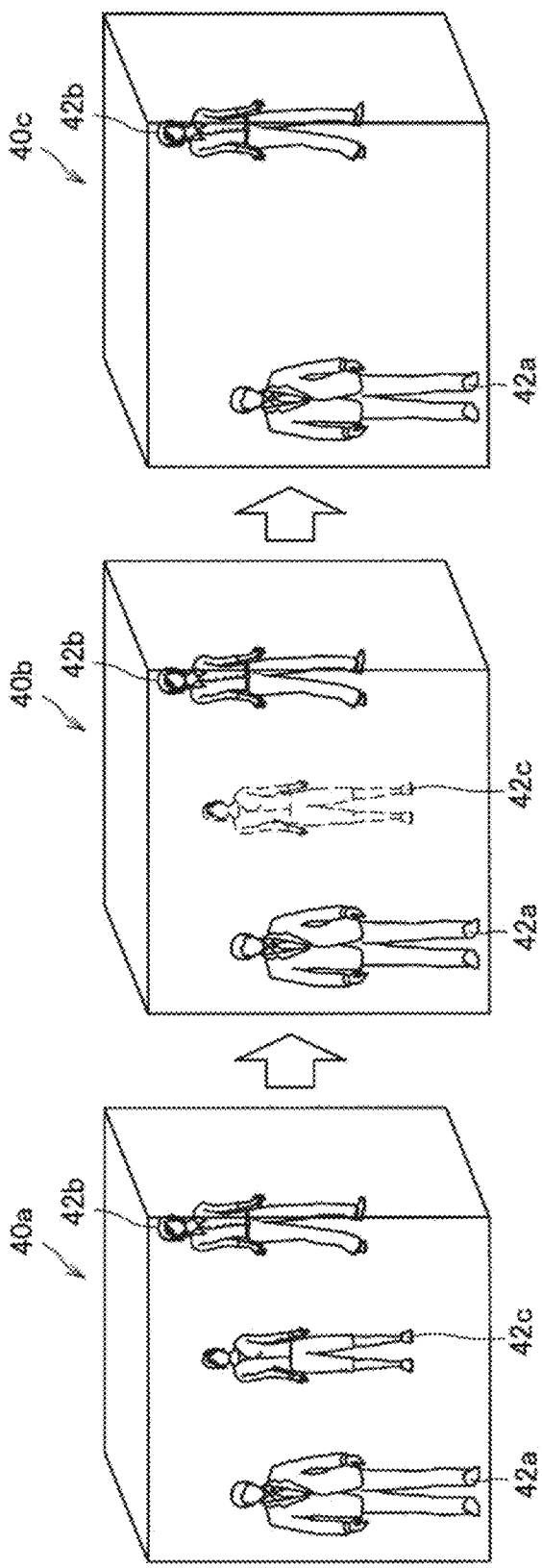
FIG. 14 is a diagram illustrating an example of an animation illustrating that display of a deletion target object is ended according to the embodiment.
Figure 15:
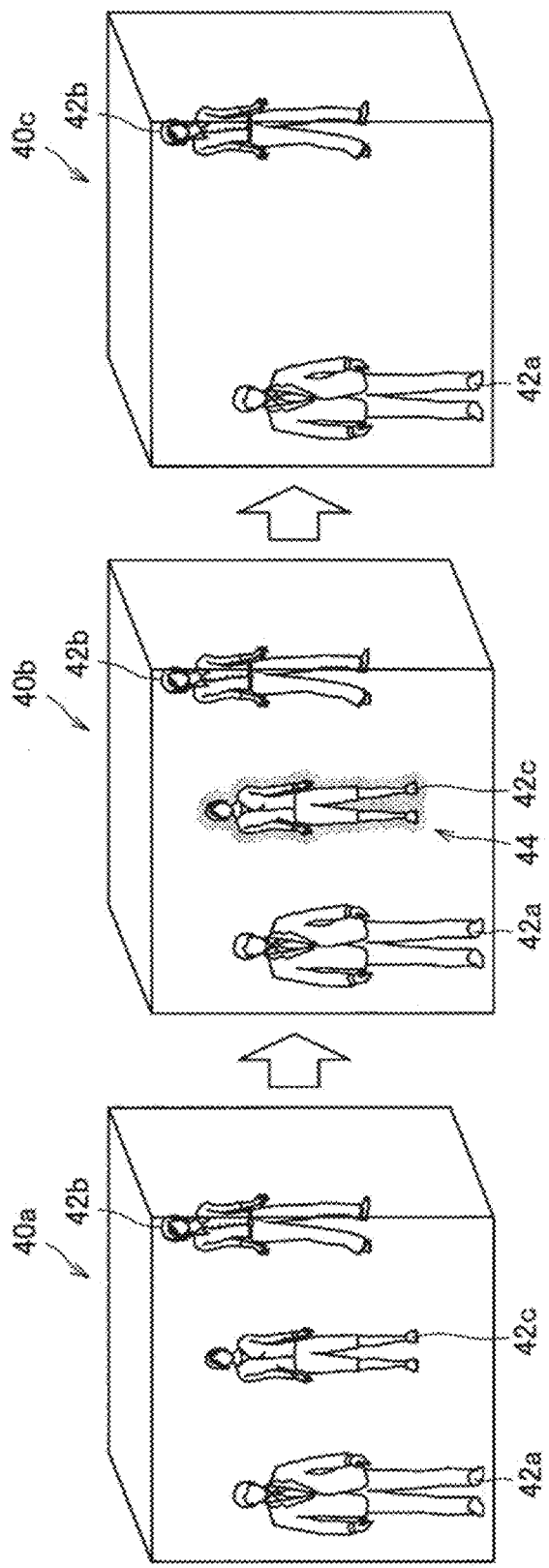
FIG. 15 is a diagram illustrating an example of an animation illustrating that display of a deletion target object is ended according to the embodiment.
Figure 16:
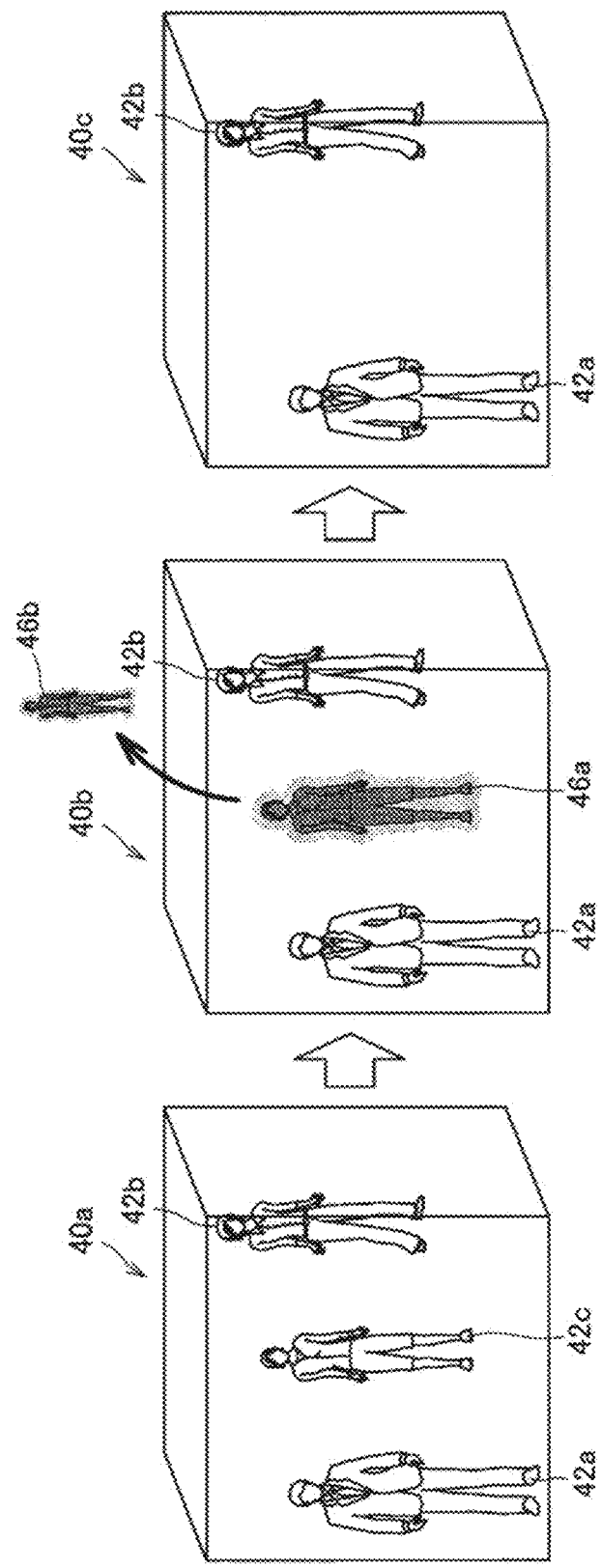
FIG. 16 is a diagram illustrating an example of an animation illustrating that display of a deletion target object is ended according to the embodiment.

Here, the above-described function will be described in further detail with reference to FIG. 14 to FIG. 16. Further, FIGS. 14 to 16 illustrate an example in which the shared space 40 is generated in the order of a shared space 40a, a shared space 40b, and a shared space 40c with the passage of time. For example, in a case in which it is decided that the object 42c is deleted, the content processing unit 406 processes the content of the free viewpoint so that an animation in which the transparency of the object 42c gradually increases from 0% to 100%, and the object 42c is not displayed is displayed as illustrated in FIG. 14. Alternatively, as illustrated in FIG. 15, the content processing unit 406 may process the content of the free viewpoint so that an animation in which a particle 44 is displayed near the object 42c of the deletion target for a predetermined period of time, and then the object 42c is not displayed is displayed. Alternatively, as illustrated in FIG. 16, the content processing unit 406 may process the content of the free viewpoint so that an animation in which the object 42c of the deletion target is transformed into a particle group 46, the particle group 46 flies to the outside of the shared space 40 while decreasing the size gradually, and then the particle group 46 disappears is displayed. With such process examples, the deletion target object (the leaving user 4 or the like) located in the shared space does not suddenly disappear. Therefore, each user who is already participating in the shared space can be prevented from feeling uncomfortable and surprised.

Further, the content processing unit 406 may process the content of the free viewpoint so that a predetermined effect sound is output at a timing at which the deletion target object is not displayed.

(2-1-6-3. When Base Space is Switched)

Further, in a case in which the additional join processing unit 402 or the end processing unit 404 decides that the base space is switched, the content processing unit 406 processes the content of the free viewpoint so that the user participating in the shared space can notice the switching of the base space. For example, the content processing unit 406 processes the content of the free viewpoint so that an animation of a predetermined period of time (for example, 10 seconds) indicating that the base space is to be switched is displayed.

Figure 17:
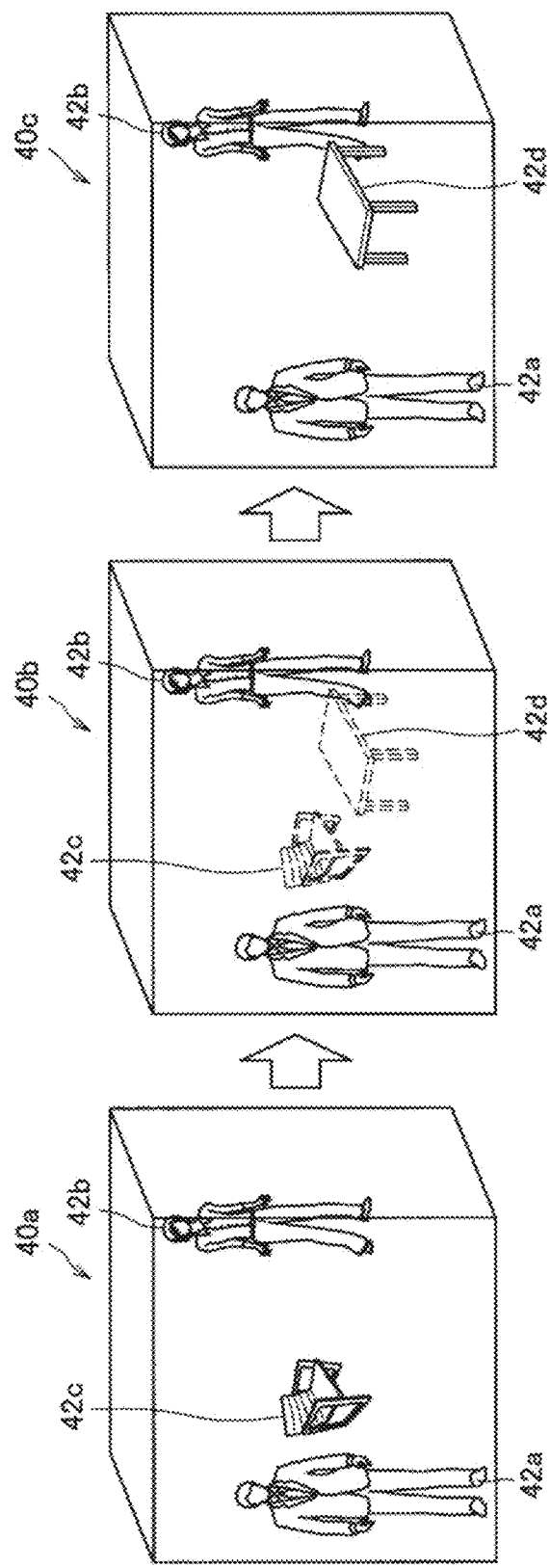
FIG. 17 is a diagram illustrating an example of an animation illustrating that a base space is switched according to the embodiment.
Figure 18:
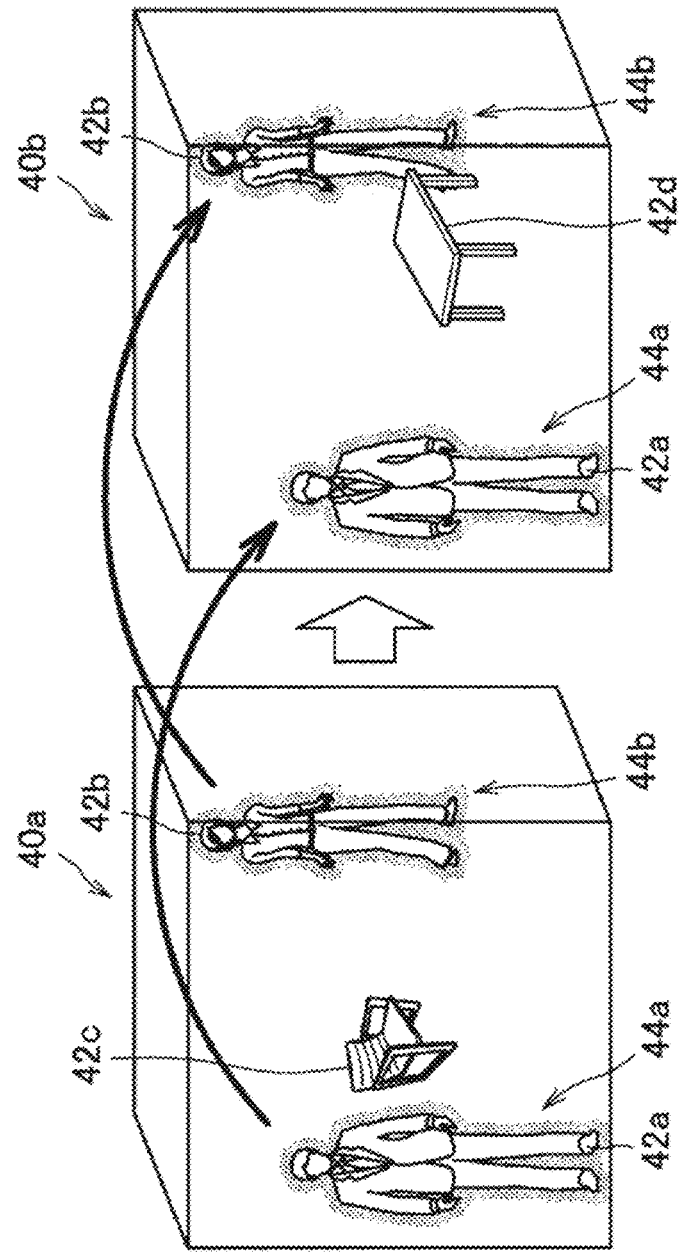
FIG. 18 is a diagram illustrating an example of an animation illustrating that a base space is switched according to the embodiment.

Here, the above-described function will be described in further detail with reference to FIG. 17 and FIG. 18. Further, FIGS. 17 and 18 illustrate an example in which the shared space 40 is generated in the order of a shared space 40a and a shared space 40b (and a shared space 40c) with the passage of time. For example, in a case in which it is decided that the base space is switched, the content processing unit 406 first causes the base space after change whose transparency is set to an initial value (for example, 100%) to be displayed superimposed on the base space before change as illustrated in FIG. 17. Then, the content processing unit 406 performs a process of gradually increasing the transparency of the base space before the change from 0% to 100% during a predetermined period of time and gradually decreasing the transparency of the base space after the change from the initial value to 0%. Further, FIG. 17 illustrates an example in which the object 42c is located in the base space before the change, and the object 42d is located in the base space after the change.

Further, as illustrated in FIG. 18, the content processing unit 406 may process the content of the free viewpoint so that an animation in which all the objects displayed together before and after the base space is changed (for example, the user remaining in the shared space after the base space is changed or the like) fly and move from the base space before the change to the base space after the change is displayed. With such process examples, in a case in which the base space is switched, a video of the content of the free viewpoint is displayed to be seamlessly noticed. Therefore, each user who is already participating in the shared space can be prevented from feeling uncomfortable and surprised.

Further, the content processing unit 406 may process the content of the free viewpoint so that a predetermined effect sound is output at a timing at which the base space is switched.

<2-2. Flow of Process>

The configuration of the present embodiment has been described above. Next, a flow of a process according to the present embodiment will be described in "2-2-1. Flow of process when space sharing is started" to "2-2-3. Flow of process at time of leaving."

{2-2-1. Flow of Process When Space Sharing is Started}

Figure 19:
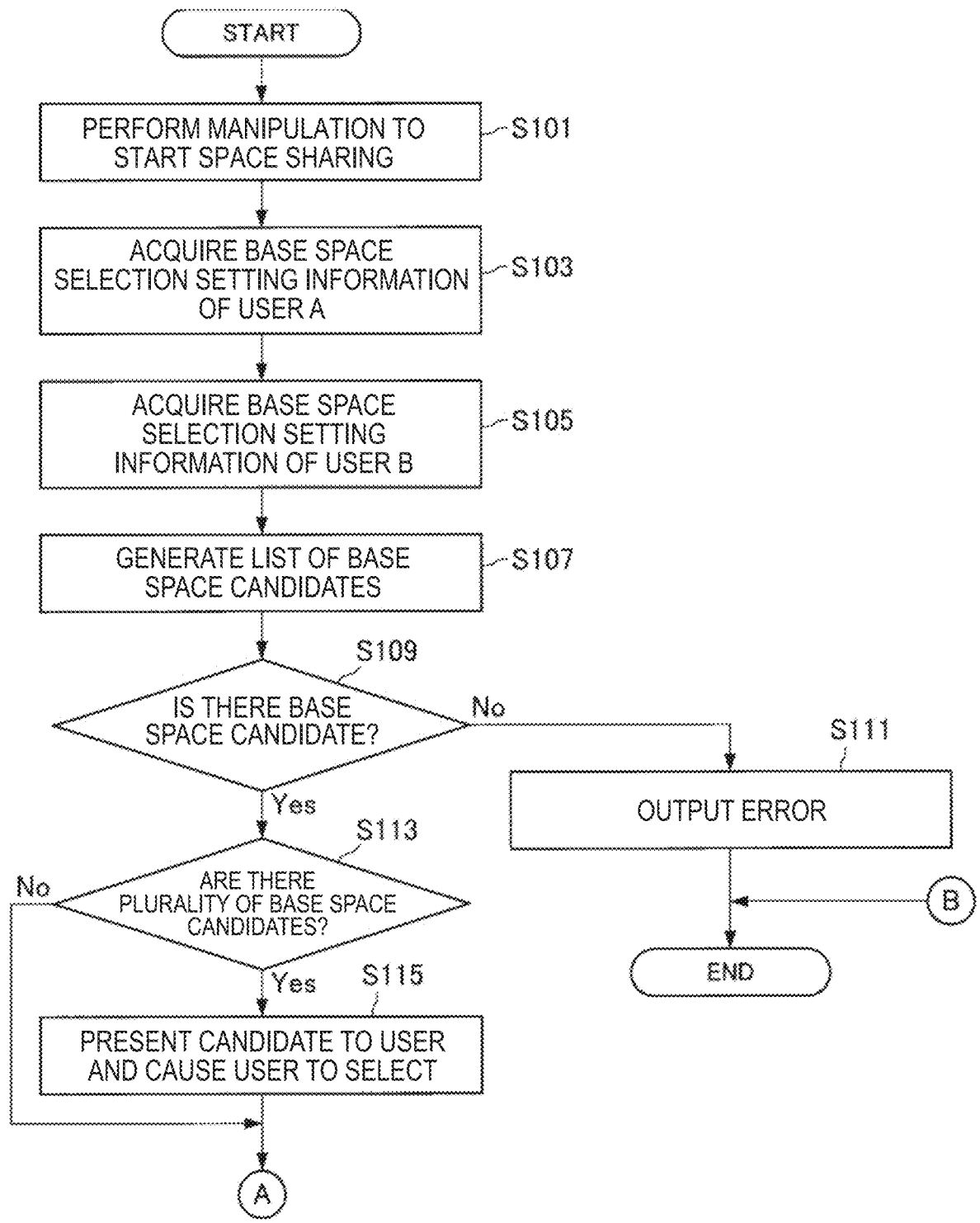
FIG. 19 is a flowchart illustrating a part of "a flow of a process when space sharing is started" according to the embodiment.
Figure 20:
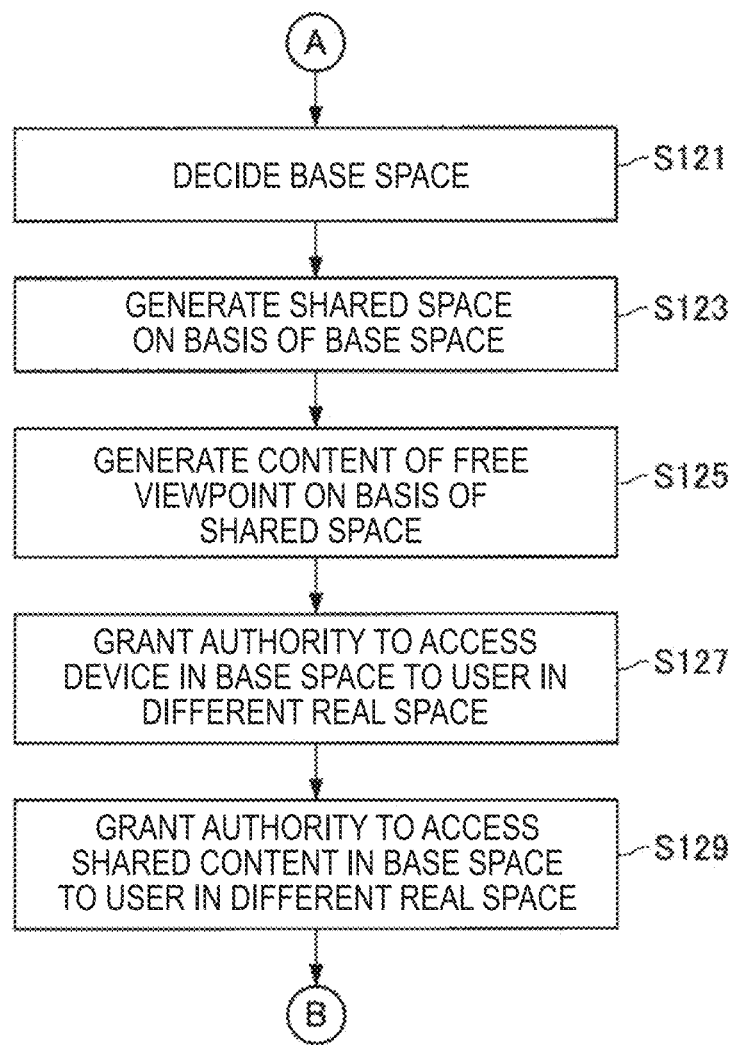
FIG. 20 is a flowchart illustrating a part of "a flow of a process when space sharing is started" according to the embodiment.

First, the "flow of a process when space sharing is started" will be described with reference to FIGS. 19 and 20. As illustrated in FIG. 19, first, the user 4a located in the real space 2a performs a manipulation to start the space sharing, for example, by designating the user 4b located in the real space 2b. Then, the input unit 22a (the sensor unit 220) in the real space 2a detects that the manipulation is performed, and transmits a detection result to the server 10 (S101).

Thereafter, in a case in which the detection result is received, the start processing unit 400 of the server 10 extracts the setting value associated with the user 4a in the base space selection setting table 170 from the base space selection setting table 170 (S103). Further, the start processing unit 400 extracts the setting value associated with the user 4b of the other party in the base space selection setting table 170 from the base space selection setting table 170 (S105).

Then, the start processing unit 400 specifies selectable base space candidates on the basis of the setting value extracted in S103 and the setting value extracted in S105, and then generates a list of specified base space candidates (S107).

In a case in which there is any one base space candidate which is not specified in S107 at all (No in S109), the start processing unit 400 decides that the content of the free viewpoint is not generated. Then, the server 10 causes the output unit 24a (for example, the display unit 246) in the real space 2a to output information indicating an error (S111). Further, the server 10 may further cause the output unit 24b in the real space 2b to output the information indicating an error. Thereafter, the "process when space sharing is started" ends.

On the other hand, in a case in which only one base space candidate is specified (Yes in S109 and No in S113), the start processing unit 400 performs the process of S121 to be described later.

On the other hand, in a case in which a plurality of base space candidates is specified (Yes in S109 and Yes in S113), the start processing unit 400 causes the output unit 24a (for example, the display unit 246) to present the list of base space candidates generated in S107, and causes the user 4a to select a desired base space candidate (S115). Further, as a modified example, the start processing unit 400 causes the list to be presented to the user 4a and the user 4b, and causes each of the two users to select a desired base space candidate.

Here, a process after S115 will be described with reference to FIG. 20. After S115, the start processing unit 400 decides the base space candidate selected in S115 or the base space candidate specified in S107 as the base space (S121).

Then, the start processing unit 400 generates the shared space on the basis of the real space different from the base space out of the real space 2a and the real space 2b and the base space decided in S121 (S123). Then, the start processing unit 400 generates the content of the free viewpoint on the basis of the generated shared space (S125).

Then, the start processing unit 400 grants the authority to access the device in the base space decided in S121 to the user 4 located in the real space different from the base space (S127).

Then, the start processing unit 400 grants the authority to access the shared content which can be reproduced in the base space decided in S121 to the user 4 located in the real space different from the base space (S129). Thereafter, the "process when space sharing is started" ends.

{2-2-2. Flow of Process at Time of Additionally Joining in Shared}

Next, a "flow of process at time of additionally joining shared space" will be described with reference to FIG. 21. Further, here, an example of a flow of process in a situation in which a user 4c who is located in the real space 2c and not participating in the shared space desires to join the shared space will be described.

Figure 21:
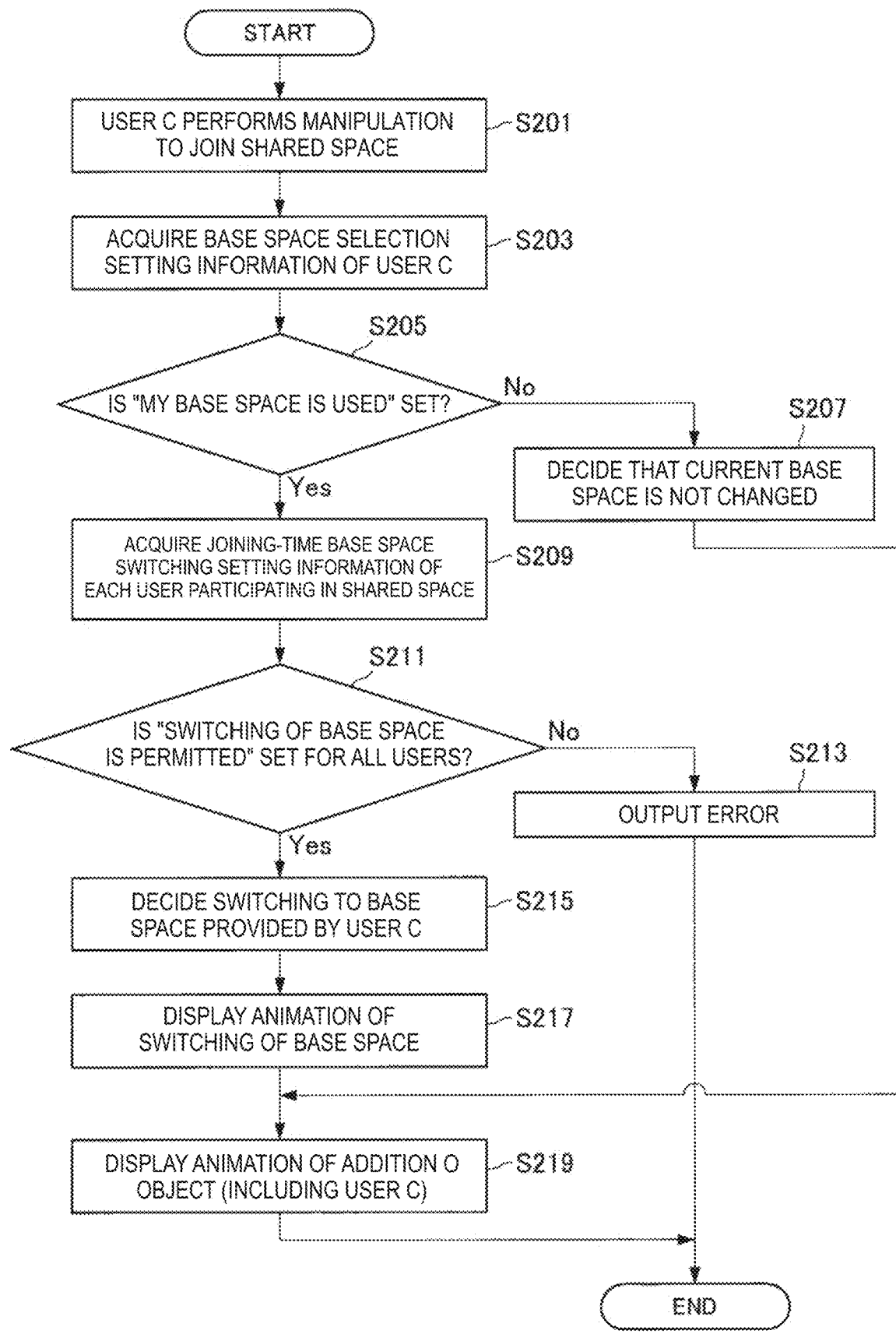
FIG. 21 is a flowchart illustrating "a flow of a process at the time of additional participation in a shared space" according to the embodiment.

As illustrated in FIG. 21, first, the user 4c performs a manipulation to newly join the shared space which the user 4c desires to participate in. Then, the input unit 22c (the sensor unit 220) in the real space 2c detects that the manipulation is performed, and then transmits a detection result to the server 10 (S201).

Thereafter, in a case in which the detection result is received, the additional join processing unit 402 of the server 10 extracts the setting value associated with the user 4c from the base space selection setting table 170 in the base space selection setting table 170 (S203).

Then, the additional join processing unit 402 decides whether or not the setting value extracted in S203 indicates "my real space is used as base space" (S205). In a case in which the setting value is not "my real space is used as base space" (No in S205), the additional join processing unit 402 decides that the base space corresponding to the shared space is not changed (S207). Thereafter, the additional join processing unit 402 performs a process of S219 to be described later.

On the other hand, in a case in which the setting value indicates "my real space is used as base space" (Yes in S205), the additional join processing unit 402 extracts the setting value associated with each user participating in the shared space in the joining-time base space switching setting table 172 from the joining-time base space switching setting table 172 (S209).

Then, the additional join processing unit 402 decides whether or not the setting values related to all the users extracted in S209 indicate "switching of base space is permitted" (S211). In a case in which the setting value related to at least one or more of the users does not indicate "switching of base space is permitted" (No in S211), the additional join processing unit 402 decides that the current base space is not switched and that the user 4c is not permitted to join the shared space. Then, the server 10 causes the output unit 24c (for example, the display unit 246) in the real space 2c to output the information indicating an error (S213). Thereafter, the "process at time of additionally joining shared space" ends.

On the other hand, in a case in which the setting values related to all the users indicate "switching of base space is permitted" (Yes in S211), the additional join processing unit 402 decides that the current base space is switched to the real space 2c (in which the user 4c is located) (S215).

Then, the content processing unit 406 processes the content of the free viewpoint so that an animation of a predetermined period of time indicating that the base space is switched is displayed. Accordingly, the output unit 24 (the display unit 246) in the real space 2 in which each user 4 participating in the shared space is located displays the animation (S217).

Thereafter, the content processing unit 406 processes the content of the free viewpoint so that an animation of a predetermined period of time indicating that display of all the objects (including the user 4c) decided to be newly placed in the shared space is started is displayed. Accordingly, the output unit 24 (display unit 246) in the real space 2 in which each user 4 participating in the shared space is located displays the animation (S219). Thereafter, the "process at time of additionally joining shared space" ends.

{2-2-3. Flow of Process at Time of Leaving}

Next, a "flow of a process at time of leaving" will be described with reference to FIGS. 22 to 24. Further, an example of a flow of a process in a situation in which one or more users among three or more users leave the shared space when three or more users are participating in the shared space.

Figure 22:
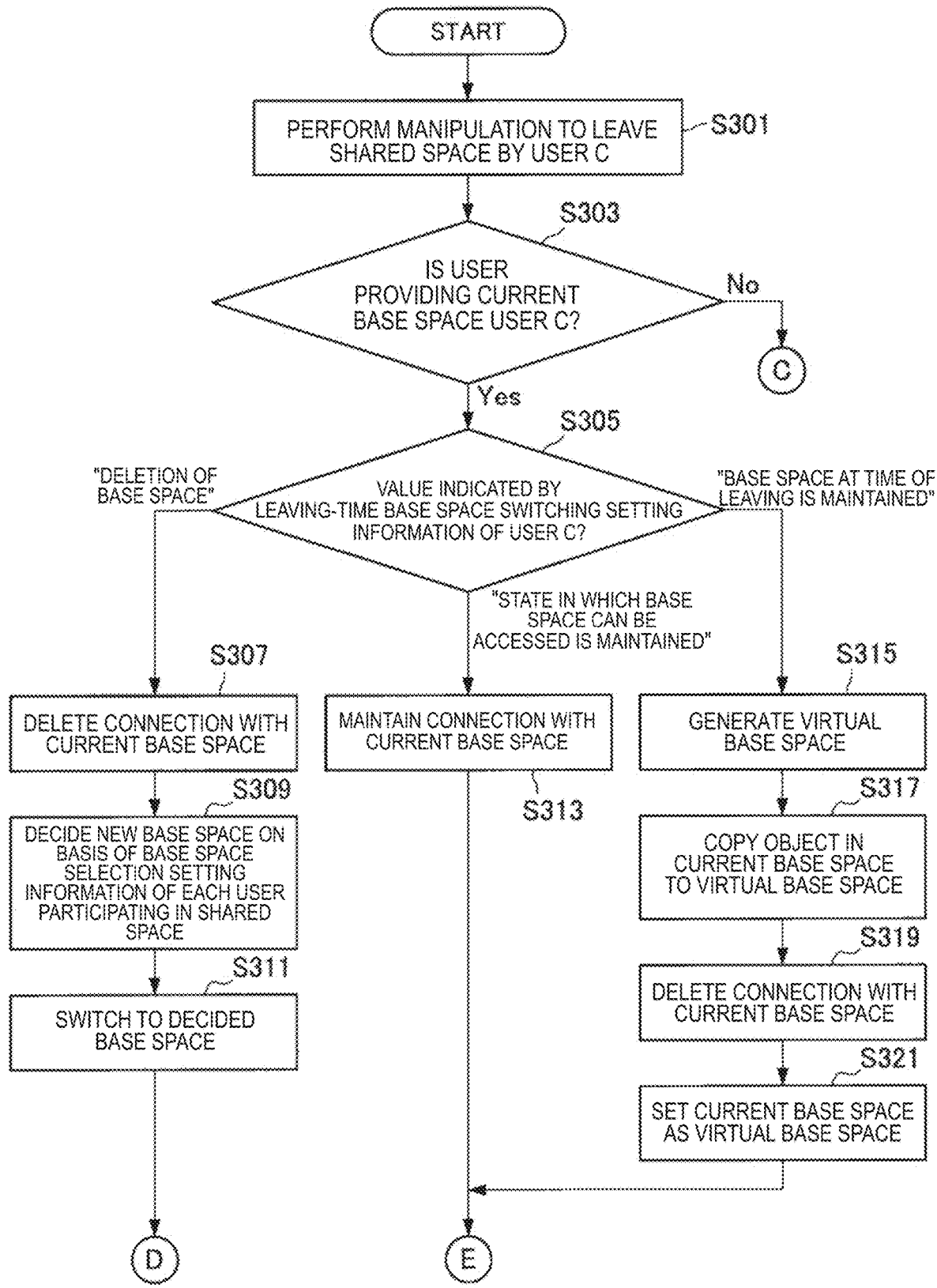
FIG. 22 is a flowchart illustrating a part of "a flow of a process at the time of leaving" according to the embodiment.
Figure 23:
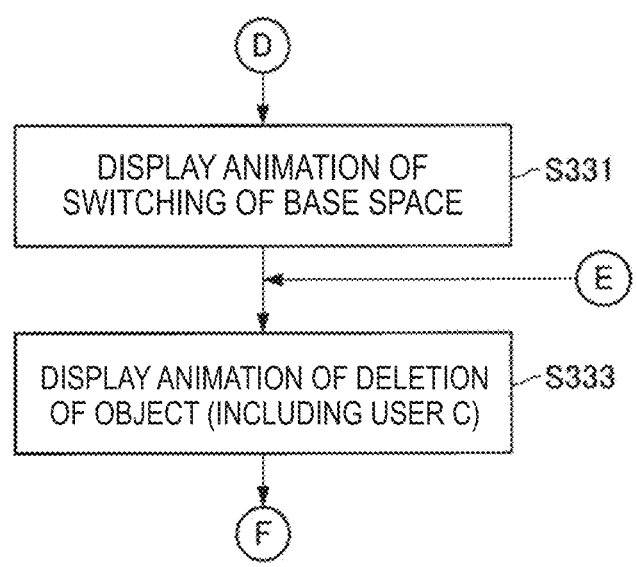
FIG. 23 is a flowchart illustrating a part of "a flow of a process at the time of leaving" according to the embodiment.

As illustrated in FIG. 22, first, any one of the users 4c participating in the generated shared space performs a manipulation to leave the shared space. Then, the input unit 22c (sensor unit 220) in the real space 2c (in which the user 4c is located) detects that the manipulation is performed, and transmits a detection result to the server 10 (S301).

Thereafter, the end processing unit 404 of the server 10 decides whether or not the base space corresponding to the shared space is identical to the real space 2c (S303). In a case in which the base space and the real space 2c are different (No in S303), the server 10 performs a process of S353 to be described later.

On the other hand, in a case in which the base space is identical to the real space 2c (Yes in S303), the end processing unit 404 extracts the setting value associated with the user 4c in the leaving-time base space switching setting table 174 from the leaving-time base space switching setting table 174 (S305).

In a case in which the extracted setting value indicates "connection with base space is deleted," the end processing unit 404 first deletes the connection with the current base space (S307). Next, the end processing unit 404 decides a new base space on the basis of the setting value associated with each user participating in the shared space in the base space selection setting table 170 (S309). Then, the end processing unit 404 decides that the decided base space is to newly connected (switched) (S311). Thereafter, the server 10 performs a process of S331 to be described later.

On the other hand, in a case in which the setting value extracted in S305 indicates "state that base space can be accessed in real time is maintained," the end processing unit 404 decides that the connection with the current base space is maintained (that is, the base space is not switched) (S313). Thereafter, the server 10 performs a process of S333 to be described later.

On the other hand, in a case in which the setting value extracted in S305 indicates "base space is maintained without change at time of leaving," the end processing unit 404 first generates a virtual base space (S315). Then, the end processing unit 404 copies all the objects in the current base space onto the generated virtual base space (S317). Then, the end processing unit 404 deletes the connection with the current base space (S319). Then, the end processing unit 404 sets the relevant virtual base space as a new base space (S321). Thereafter, the end processing unit 404 performs a process of S333 to be described later.

Here, a flow after of a process S311 will be described with reference to FIG. 23. As illustrated in FIG. 23, after S311, the content processing unit 406 of the server 10 processes the content of the free viewpoint so that an animation of a predetermined period of time indicating that the base space is switched is displayed. Accordingly, the output unit 24 (display unit 246) in the real space 2 in which each user 4 participating in the shared space is located displays the animation (S331).

Thereafter, the content processing unit 406 processes the content of the free viewpoint so that an animation of a predetermined period of time indicating that display of all objects (including the user 4c) decided to be deleted from the shared space is ended is displayed. Accordingly, the output unit 24 (display unit 246) in the real space 2 in which each user 4 participating in the shared space is located displays the animation (S333).

Here, a flow of a process after S333 will be described with reference to FIG. 24. As illustrated in FIG. 24, after S333, the end processing unit 404 extracts the setting value associated with the user 4c from the leaving-time device access authority change setting table 176 in the leaving-time device access authority change setting table 176 (S341).

Then, the end processing unit 404 decides whether or not the setting value extracted in S341 indicates "all access authorities are revoked" (S343). In a case in which the setting value does not indicate "all access authorities are revoked" (No in S343), the end processing unit 404 performs a process of S347 to be described later.

On the other hand, in a case in which the setting value indicates "all access authorities are revoked" (Yes in S343), the end processing unit 404 changes the access authority of each user 4 so that each user 4 participating in the shared space is prohibited from accessing all the devices in the base space before the change (S345).

Then, the end processing unit 404 extracts the setting value associated with the user 4c from the leaving-time shared content access authority change setting table 178 in the leaving-time shared content access authority change setting table 178 (S347).

Then, the end processing unit 404 decides whether or not the setting value extracted in S347 indicates "all access authorities are revoked" (S349). In a case in which the setting value does not indicate "all access authorities are revoked" (No in S349), the "process at time of leaving" ends.

On the other hand, in a case in which the setting value indicates "all access authorities are revoked" (Yes in S349), the end processing unit 404 changes the access authority of each the user 4 so that each user 4 participating in the shared space is prohibited from accessing all pieces of shared content which can be reproduced in the base space before the change (S351), Thereafter, the "process at the time of leaving" ends.

Figure 24:
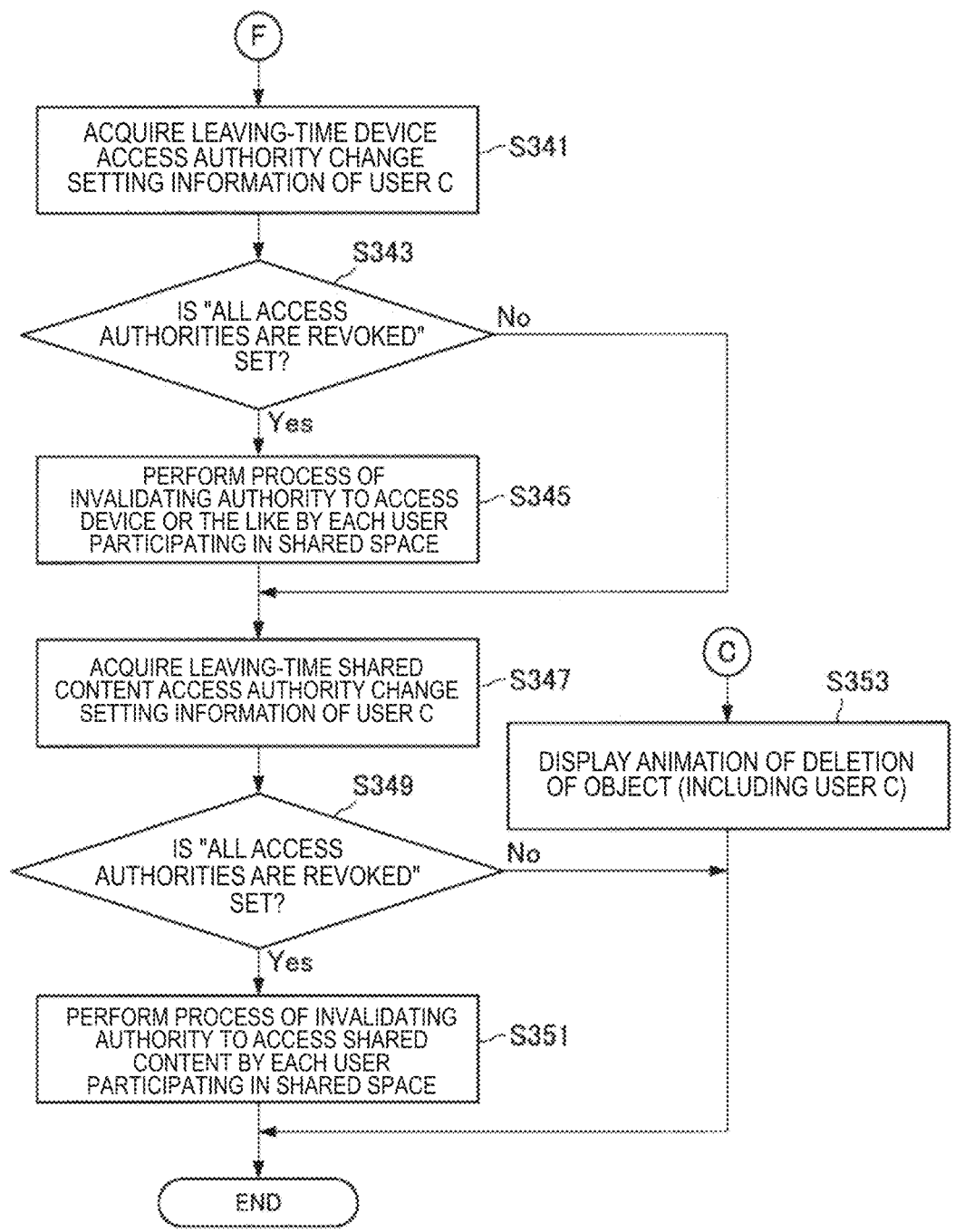
FIG. 24 is a flowchart illustrating a part of "a flow of a process at the time of leaving" according to the embodiment.

Further, as illustrated in FIG. 24, in a case in which the current base space and the real space 2c are different in S303 (No in S303), the server 10 performs display control of an animation indicating that the display of the object of the deletion target is ended, substantially similarly to S333 described above (step S353). Thereafter, the "process at the time of leaving" ends.

(Modified Examples)

Further, in the above description, the example of the process in the situation in which three or more persons are participating in the shared space has been described, but the present disclosure is not limited to this example, and even in a case in which only two persons are participating in the shared space, the "flow of the process at time of leaving" may be similarly applied. In other words, a similar process can be applied even in a case in which one remaining user continues to participate in the shared space after a certain user leaves. Alternatively, in this case, the server 10 may end the space sharing itself. In other words, the server 10 may end delivery of the content of the free viewpoints to all the clients 20.

<2-3. Effects>

{2-3-1. Effect 1}

As described above, according to the present embodiment, in a case in which the information indicating the start or the end of the use of the content of the free viewpoint by the user is acquired, the server 10 changes the settings related to the use of the content of the free viewpoint on the basis of the setting information related to the start or the end of the use of the content. For example, in a case in which the information indicating the end of the use of the content of the free viewpoint by the user is acquired, the server 10 sets restrictions related to the use of the content of the free viewpoint on the basis of the registered content of the setting information DB 160. Accordingly, it is possible to appropriately restrict the use of the content in a situation in which the user ends the use of the content.

For example, in a case in which the user leaves the shared space, the server 10 can restrict the use of the content by other users who are sharing the shared space in accordance with the setting value associated with the user (or the real space in which the user is located) in the setting information DB 160. Further, the user can register a desired value in the setting information DB 160 in advance regarding the settings of the shared space when leaving the shared space. Therefore, even after the user leaves the shared space, the privacy of the user is properly protected.

{2-3-2. Effect 2}

Further, the server 10 can manage the authority to access the device in the base space and the authority to access the shared content of each user participating in the shared space uniformly. For example, the base space may be gradually switched as a new user joints the shared space or the user leaves the shared space, but in this case, the server 10 can also manage (change) the authority of each user to access the device or the shared content smoothly.

3. Hardware Configuration

Next, a hardware configuration of the server 10 according to the embodiment will be described with reference to FIG. 25. As illustrated in FIG. 25, the server 10 includes a CPU 900, a read only memory (ROM) 902, a RAM 904, a bus 906, an interface 908, a storage device 910 and a communication device 912.

The CPU 900, which functions as an arithmetic processing unit and a control device, controls the whole operation within the server 10 in accordance with various kinds of programs. Further, the CPU 900 includes a processor such as a microprocessor. The CPU 900 can function as the shared space managing unit 100, the stream separating unit 124, and the stream generating unit 130 in the server 10.

The ROM 902 stores programs, control data such as an operation parameter, or the like, to be used by the CPU 900.

The RAM 904 temporarily stores, for example, programs to be executed by the CPU 900.

The bus 906 includes a CPU bus, or the like. The bus 906 interconnects the CPU 900, the ROM 902 and the RAM 904.

The interface 908 connects the storage device 910 and the communication device 912 to the internal bus 906.

The storage device 910 is a device for data storage. The storage device 910 includes, for example, a storage medium, a recording device which records data in the storage medium, a readout device which reads out data from the storage medium, a deletion device which deletes data recorded in the storage medium, or the like. The storage device 910 can function as the shared space frame data DB 156 and the setting information DB 160 in the server 10.

The communication device 912 is a communication interface including a communication device (e.g., network card), or the like, for connecting to, for example, the communication network 26, or the like. Further, the communication device 912 may be a communication device supporting a wireless LAN, a communication device supporting long term evolution (LTE) or a wired communication device which performs communication in a wired manner. The communication device 912 may function as the control information transmitting unit 122, the receiving unit 126, the control information receiving unit 128, and the transmitting unit 132 in the server 10.

4. Modified Example

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, in the above-described embodiment, the example in which the information processing device of the present disclosure is the server 10 has been described, but the present disclosure is not limited thereto. For example, the information processing device may be a general-purpose PC, a tablet terminal, a game machine, a mobile phone such as a smartphone, a portable music player, a robot, or a wearable device such as, for example, an HMD or AR glasses.

Further, the steps of the flow of the process according to the above-described embodiment do not necessarily have to be executed in the described order. For example, the order in which the steps are executed may be changed as appropriate. Further, the steps may be partially executed in parallel or individually instead of being executed in chronological order. Further, some of steps described may be omitted, or other steps may be added.

Further, in accordance with the above-described embodiment, it is also possible to provide a computer program causing hardware such as the CPU 900, the ROM 902, and the RAM 904 to execute the same functions as those of the components of the server 10 according to the above-described embodiment. Further, a recording medium having the computer program recorded therein is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device, including:
 an acquiring unit configured to acquire information indicating an end of use of content of a free viewpoint by a first user, which is provided on the basis of sensing of a real space and shared by at least the first user and a second user; and
 a use restricting unit configured to set a restriction related to the use of the content of the free viewpoint on the basis of the information indicating the end of the use and first setting information.

(2)

The information processing device according to (1), in which the content of the free viewpoint is content provided on the basis of sensing of a first real space in which the first user is located and sensing of a second real space in which the second user is located.

(3)

The information processing device according to (2), in which the use restricting unit sets the restriction related to the use of the content of the free viewpoint after the end of the use of the content of the free viewpoint by the first user on the basis of the information indicating the end of the use and the first setting information.

(4)

The information processing device according to (2) or (3), in which the use restricting unit sets the restriction related to the use of the content of the free viewpoint by the second user on the basis of the information indicating the end of the use and the first setting information.

(5)

The information processing device according to any one of (2) to (4), in which the first setting information is associated with the first real space.

(6)

The information processing device according to any one of (2) to (5), in which the first setting information is associated with the first user.

(7)

The information processing device according to any one of (2) to (6), in which the first setting information is setting information obtained when the use of the content of the free viewpoint ends.

(8)

The information processing device according to any one of (2) to (7), in which the restriction related to the use of the content of the free viewpoint include a restriction related to use of a base space associated with the content of the free viewpoint and/or an object in the base space, and
the base space is a space based on one of a plurality of real spaces including the first real space and the second real space.

(9)

The information processing device according to (8), in which the restriction related to the use of the object in the base space includes a restriction related to access to the object in the base space.

(10)

The information processing device according to (8) or (9), in which the use restricting unit changes settings related to the base space on the basis of the information indicating the end of the use and the first setting information.

(11)

The information processing device according to (10), in which the use restricting unit switches the base space associated with the content of the free viewpoint from the first base space to the second base space on the basis of the information indicating the end of the use and the first setting information.

(12)

The information processing device according to (11), in which the use restricting unit switches the first base space to the second base space by deleting an association between the content of the free viewpoint and the first base space on the basis of the information indicating the end of the use and the first setting information and associating the content of the free viewpoint with the second base space.

(13)

The information processing device according to (11) or (12), in which the use restricting unit decides one of the plurality of real spaces as the second base space on the basis of second setting information associated with the second real space or the second user.

(14)

The information processing device according to any one of (11) to (13), further including a content processing unit configured to process the content of the free viewpoint to indicate that the first base space is consecutively changed to the second base space in a case in which the base space associated with the content of the free viewpoint is switched from the first base space to the second base space.

(15)

The information processing device according to (8) or (9), in which the object in the base space includes a device, and
the use restricting unit changes authority of the second user to access the device on the basis of the information indicating the end of the use and the first setting information.

(16)

The information processing device according to (8) or (9), in which object in the base space includes content, and
the use restricting unit changes authority of the second user to access the content on the basis of the information indicating the end of the use and the first setting information.

(17)

The information processing device according to (8), in which the use restricting unit deletes one or more objects in the base space indicated by the first setting information from the base space.

(18)

The information processing device according to (17), further including a content processing unit configured to consecutively change a display form of the one or more objects in the content of the free viewpoint in a case in which one or more objects in the base space are deleted from the base space.

(19)

An information processing method, including:
acquiring information indicating an end of the use of content of a free viewpoint by a first user, which is provided on the basis of sensing of a real space and shared by at least the first user and a second user; and
setting, by a processor, a restriction related to the use of the content of the free viewpoint on the basis of the information indicating the end of the use and first setting information.

(20)

A program causing a computer to function as:
an acquiring unit configured to acquire information indicating an end of use of content of a free viewpoint by a first user, which is provided on the basis of sensing of a real space and shared by at least the first user and a second user; and
a use restricting unit configured to set a restriction related to the use of the content of the free viewpoint on the basis of the information indicating the end of the use and first setting information.

REFERENCE SIGNS LIST 10 server
20 client
22 input unit
24 output unit
26 communication network
100 shared space managing unit
102 shared space generating unit
104, 224, 250 recognizing unit
106 event recognizing unit
108 control unit
120 client connecting unit
122, 252 control information transmitting
124, 242 stream separating unit
126, 240 receiving unit 128, 222 control information receiving unit
130, 226 stream generating unit
132, 228 transmitting unit
150 synchronizing unit
152 shared space synthesizing unit
154 delivering unit
156 shared space frame data DB
160 setting information DB
220, 248 sensor unit
226 stream generating unit
228 transmitting unit
244 synthesizing unit
246 display unit
400 start processing unit
402 additional join processing unit
404 end processing unit
406 content processing unit

The invention claimed is:

1. An information processing device, comprising:
an acquiring unit configured to acquire information indicating an end of use of content of a free viewpoint by a first user, the free viewpoint being provided on a basis of sensing of a real space and shared by at least the first user and a second user; and
a use restricting unit configured to set a restriction related to the use of the content of the free viewpoint by the second user on a basis of the information indicating the end of the use and first setting information,
wherein the content of the free viewpoint is content provided on a basis of sensing of a first real space in which the first user is located and sensing of a second real space in which the second user is located, the second real space being different than the first real space, and
wherein the acquiring unit and the use restricting unit are each implemented via at least one processor.

2. The information processing device according to claim 1, wherein the use restricting unit sets the restriction related to the use of the content of the free viewpoint after the end of the use of the content of the free viewpoint by the first user on a basis of the information indicating the end of the use and the first setting information.

3. The information processing device according to claim 1, wherein the use restricting unit sets the restriction related to the use of the content of the free viewpoint by the second user on a basis of the information indicating the end of the use and the first setting information.

4. The information processing device according to claim 1, wherein the first setting information is associated with the first real space.

5. The information processing device according to claim 1, wherein the first setting information is associated with the first user.

6. The information processing device according to claim 1, wherein the first setting information is setting information obtained when the use of the content of the free viewpoint ends.

7. The information processing device according to claim 1, wherein the restriction related to the use of the content of the free viewpoint includes a restriction related to use of a base space associated with the content of the free viewpoint and/or an object in the base space, and
the base space is a space based on one of a plurality of real spaces including the first real space and the second real space.

8. The information processing device according to claim 7, wherein the restriction related to the use of the object in the base space includes a restriction related to access to the object in the base space.

9. The information processing device according to claim 7, wherein the use restricting unit changes settings related to the base space on a basis of the information indicating the end of the use and the first setting information.

10. The information processing device according to claim 9, wherein the use restricting unit switches the base space associated with the content of the free viewpoint from a first base space to a second base space on a basis of the information indicating the end of the use and the first setting information.

11. The information processing device according to claim 10, wherein the use restricting unit switches the first base space to the second base space by deleting an association between the content of the free viewpoint and the first base space on a basis of the information indicating the end of the use and the first setting information and associating the content of the free viewpoint with the second base space.

12. The information processing device according to claim 10, wherein the use restricting unit decides one of the plurality of real spaces as the second base space on a basis of second setting information associated with the second real space or the second user.

13. The information processing device according to claim 10, further comprising a content processing unit configured to process the content of the free viewpoint to indicate that the first base space is consecutively changed to the second base space in a case in which the base space associated with the content of the free viewpoint is switched from the first base space to the second base space.

14. The information processing device according to claim 7, wherein the object in the base space includes a device, and
the use restricting unit changes authority of the second user to access the device on a basis of the information indicating the end of the use and the first setting information.

15. The information processing device according to claim 7, wherein the object in the base space includes content, and
the use restricting unit changes authority of the second user to access the content on a basis of the information indicating the end of the use and the first setting information.

16. The information processing device according to claim 7, wherein the use restricting unit deletes one or more objects in the base space indicated by the first setting information from the base space.

17. The information processing device according to claim 16, further comprising a content processing unit configured to consecutively change a display form of the one or more objects in the content of the free viewpoint in a case in which one or more objects in the base space are deleted from the base space.

18. An information processing method, comprising:
acquiring information indicating an end of use of content of a free viewpoint by a first user, the free viewpoint being provided on a basis of sensing of a real space and shared by at least the first user and a second user; and
setting, by a processor, a restriction related to the use of the content of the free viewpoint by the second user on a basis of the information indicating the end of the use and first setting information,
wherein the content of the free viewpoint is content provided on a basis of sensing of a first real space in which the first user is located and sensing of a second real space in which the second user is located, the second real space being different than the first real space.

19. A non-transitory computer-readable medium having embodied thereon a program, which when executed by a computer causes the computer to execute an information processing method, the method comprising:

acquiring information indicating an end of use of content of a free viewpoint by a first user, the free viewpoint being provided on a basis of sensing of a real space and shared by at least the first user and a second user; and setting a restriction related to the use of the content of the free viewpoint by the second user on a basis of the information indicating the end of the use and first setting information, wherein the content of the free viewpoint is content provided on a basis of sensing of a first real space in which the first user is located and sensing of a second real space in which the second user is located, the second real space being different than the first real space.

* * * * *